(12) United States Patent
Sasaki et al.

(10) Patent No.: US 7,468,864 B2
(45) Date of Patent: Dec. 23, 2008

(54) MAGNETIC HEAD FOR PERPENDICULAR MAGNETIC RECORDING AND METHOD OF MANUFACTURING SAME

(75) Inventors: Yoshitaka Sasaki, Milpitas, CA (US); Dong-Hong Li, Milpitas, CA (US); Shigeki Tanemura, Milpitas, CA (US); Hiroyuki Itoh, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 726 days.

(21) Appl. No.: 10/880,509

(22) Filed: Jul. 1, 2004

(65) Prior Publication Data
US 2006/0002014 A1  Jan. 5, 2006

(51) Int. Cl.
*G11B 5/31* (2006.01)
(52) U.S. Cl. ..................................... 360/126
(58) Field of Classification Search ................. 360/126, 360/113
See application file for complete search history.

(56) References Cited

U.S. PATENT DOCUMENTS

| | | | |
|---|---|---|---|
| 4,656,546 A | 4/1987 | Mallory | |
| 4,672,493 A | 6/1987 | Schewe | |
| 6,104,574 A | 8/2000 | Takano et al. | |
| 6,504,675 B1 | 1/2003 | Shukh et al. | |
| 6,710,973 B2 | 3/2004 | Okada et al. | |
| 6,809,899 B1 * | 10/2004 | Chen et al. | 360/125.13 |
| 6,836,957 B2 * | 1/2005 | Kobayashi | 29/603.16 |
| 6,891,697 B2 * | 5/2005 | Nakamura et al. | 360/125.12 |
| 6,950,277 B1 * | 9/2005 | Nguy et al. | 360/125.14 |
| 6,952,867 B2 * | 10/2005 | Sato | 29/603.15 |
| 7,006,326 B2 * | 2/2006 | Okada et al. | 360/125.13 |
| 7,206,166 B2 * | 4/2007 | Notsuke et al. | 360/122 |
| 7,239,478 B1 * | 7/2007 | Sin et al. | 360/125.3 |
| 7,251,103 B2 * | 7/2007 | Hsiao et al. | 360/125.03 |
| 2003/0151850 A1 | 8/2003 | Nakamura et al. | |
| 2004/0184191 A1 * | 9/2004 | Ichihara et al. | 360/126 |

FOREIGN PATENT DOCUMENTS

| | | |
|---|---|---|
| JP | A 10-105921 | 4/1998 |
| JP | A 10-198930 | 7/1998 |
| JP | A 2002-015406 | 1/2002 |
| JP | A 2002-92821 | 3/2002 |
| JP | A 2003-203311 | 7/2003 |
| JP | A 2003-242607 | 8/2003 |
| JP | A-2004-165434 | 6/2004 |
| WO | WO 97/08687 A1 | 3/1997 |

* cited by examiner

*Primary Examiner*—Mark Blouin
(74) *Attorney, Agent, or Firm*—Oliff & Berridge, PLC

(57) ABSTRACT

A pole layer has an end located in a medium facing surface, the end having: a first side close to a substrate; a second side located opposite to the first side; a third side connecting an end of the first side to an end of the second side; and a fourth side connecting the other end of the first side to the other end of the second side. The second side defines a track width. The end of the pole layer located in the medium facing surface has a width that decreases toward the first side. The pole layer is disposed in a groove of a pole-layer-encasing layer made of a nonmagnetic insulating material, with a nonmagnetic conductive film provided between the encasing layer and the pole layer. The pole layer incorporates: a first layer located closer to the surface of the groove; and a second layer located farther from the surface of the groove.

3 Claims, 24 Drawing Sheets

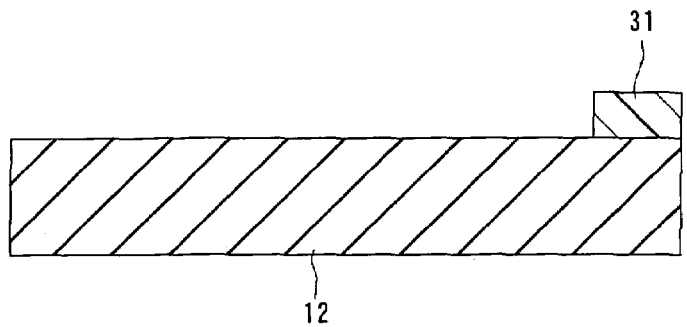 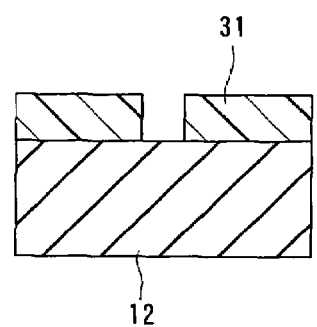
FIG. 4A    FIG. 4B
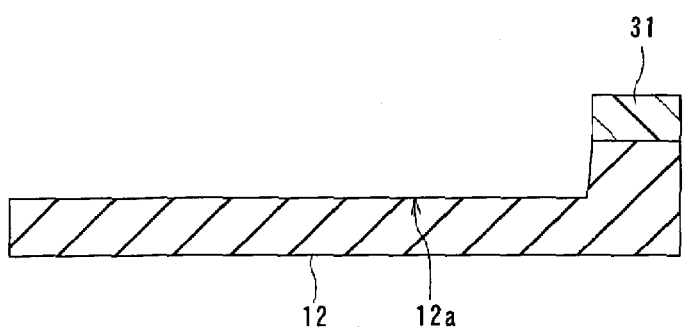 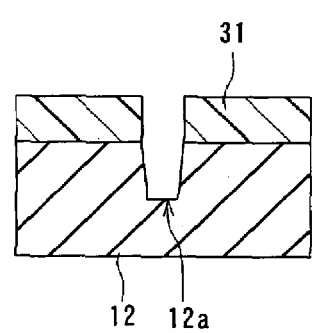
FIG. 5A    FIG. 5B
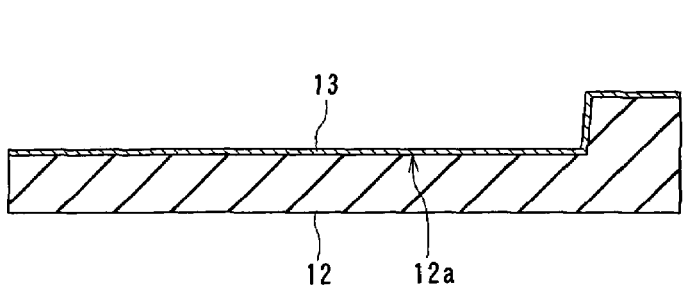 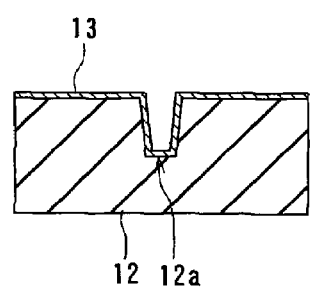
FIG. 6A    FIG. 6B

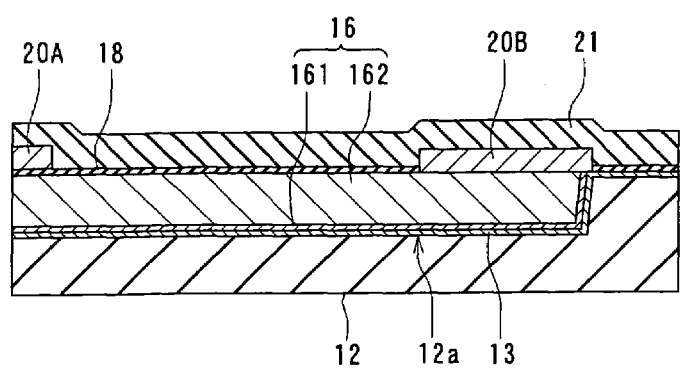 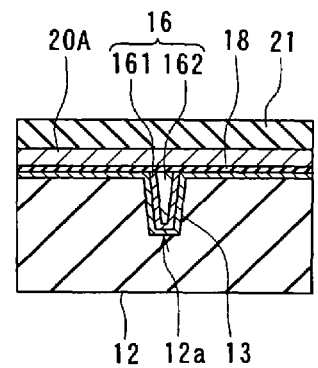
FIG. 10A   FIG. 10B
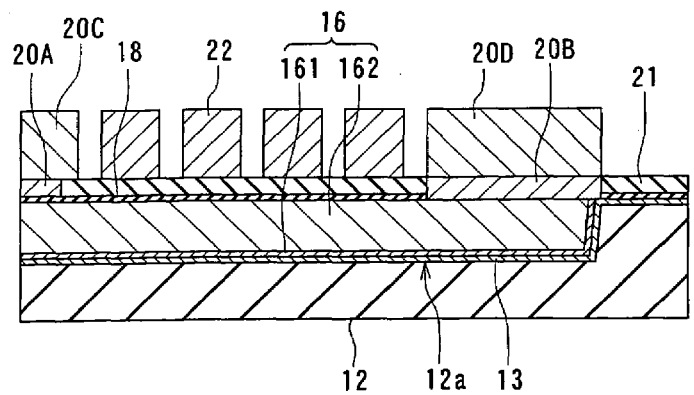 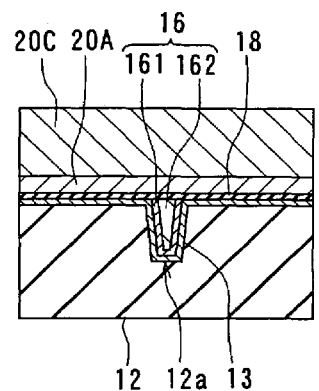
FIG. 11A   FIG. 11B

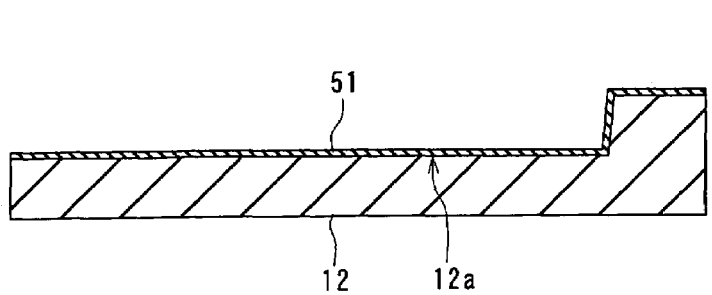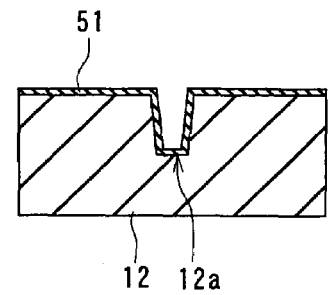
FIG. 14A  FIG. 14B
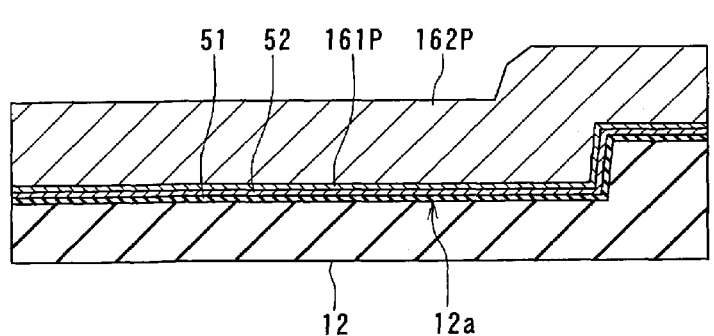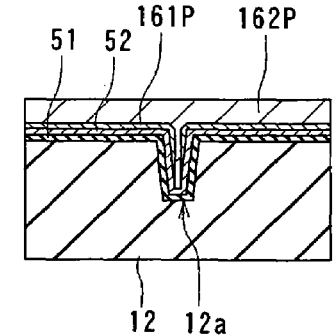
FIG. 15A  FIG. 15B
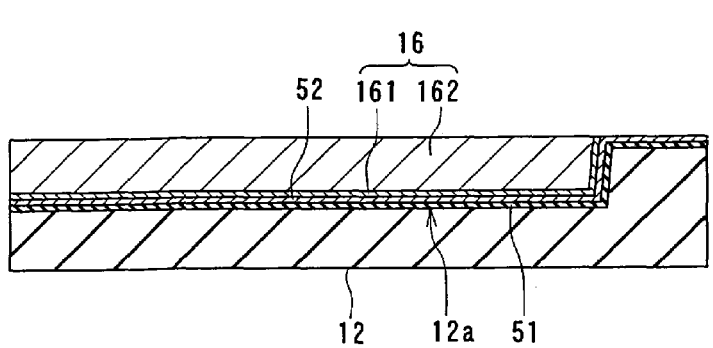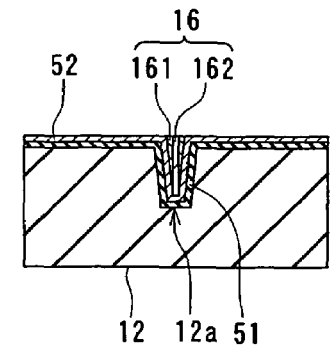
FIG. 16A  FIG. 16B

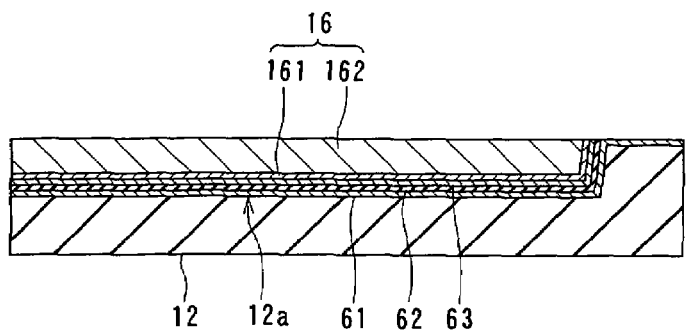
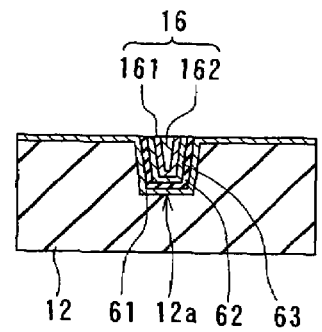
FIG. 24A    FIG. 24B
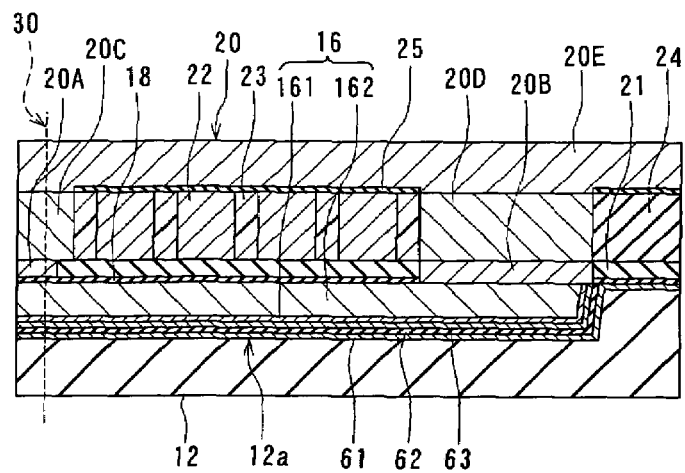
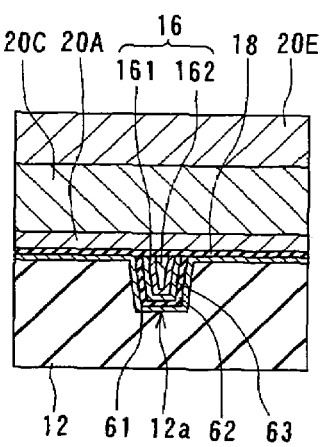
FIG. 25A    FIG. 25B

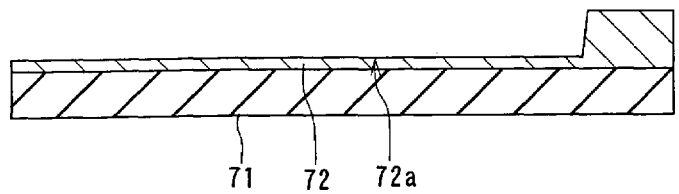 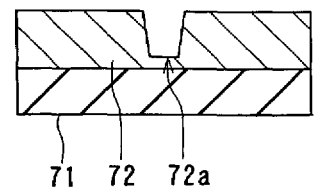
FIG. 26A    FIG. 26B
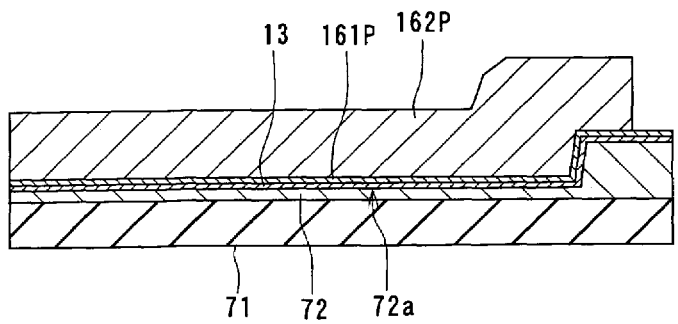 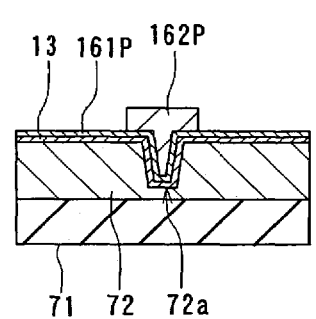
FIG. 27A    FIG. 27B
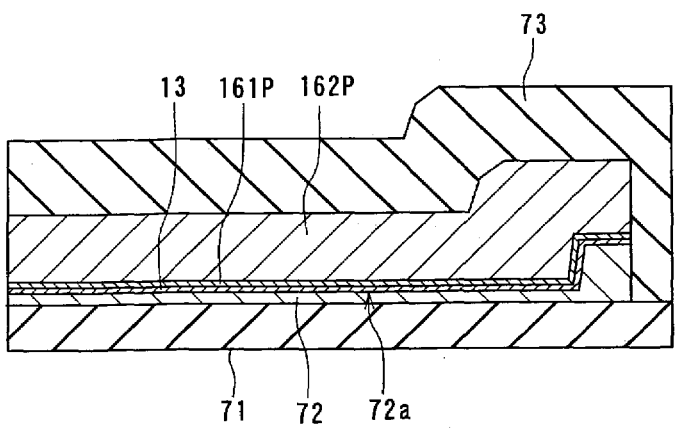 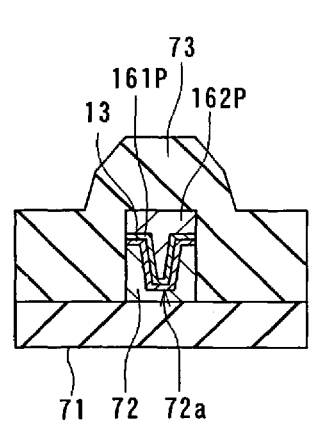
FIG. 28A    FIG. 28B

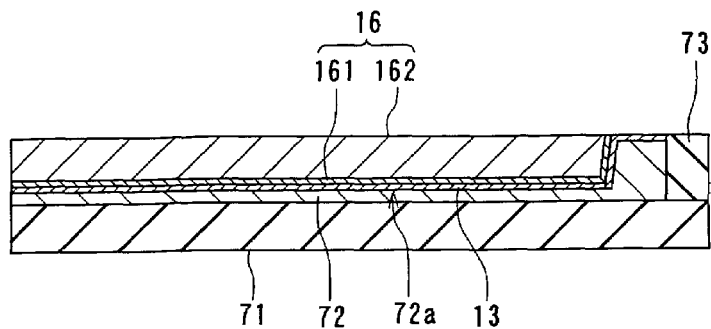
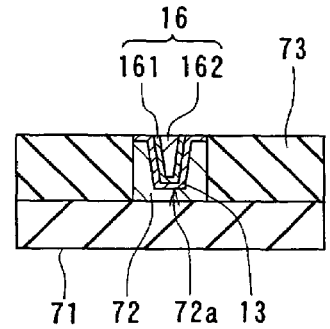
FIG. 29A          FIG. 29B
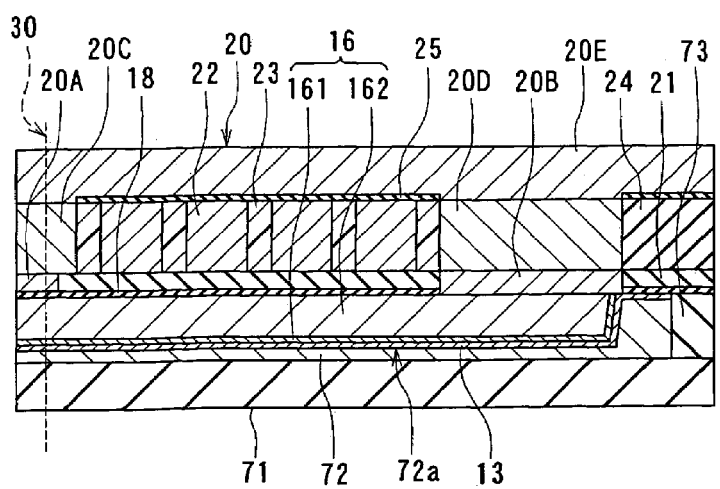
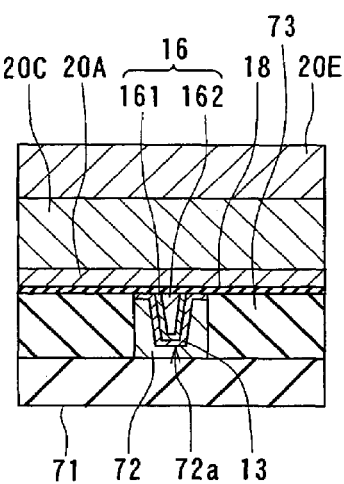
FIG. 30A          FIG. 30B

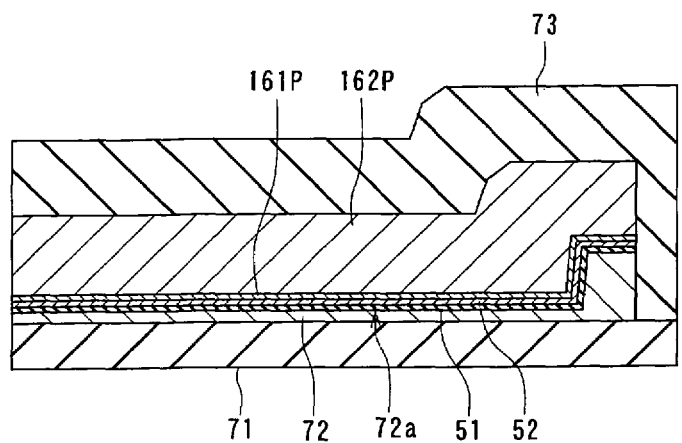 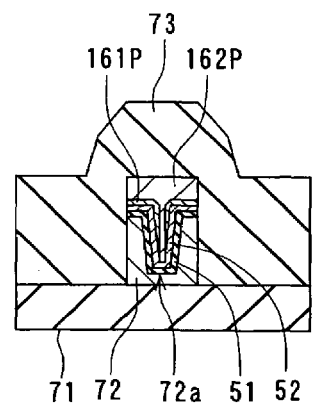
FIG. 33A                    FIG. 33B
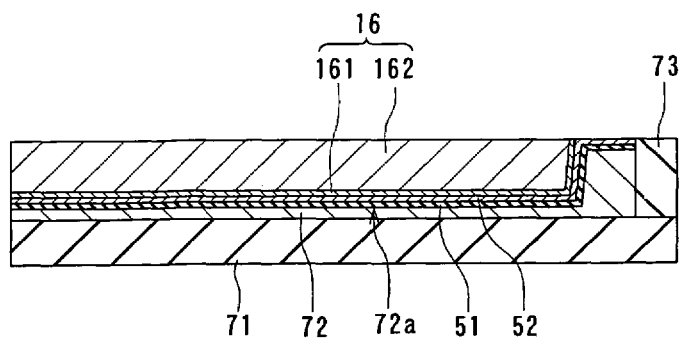 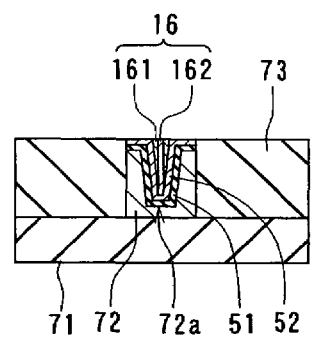
FIG. 34A                    FIG. 34B

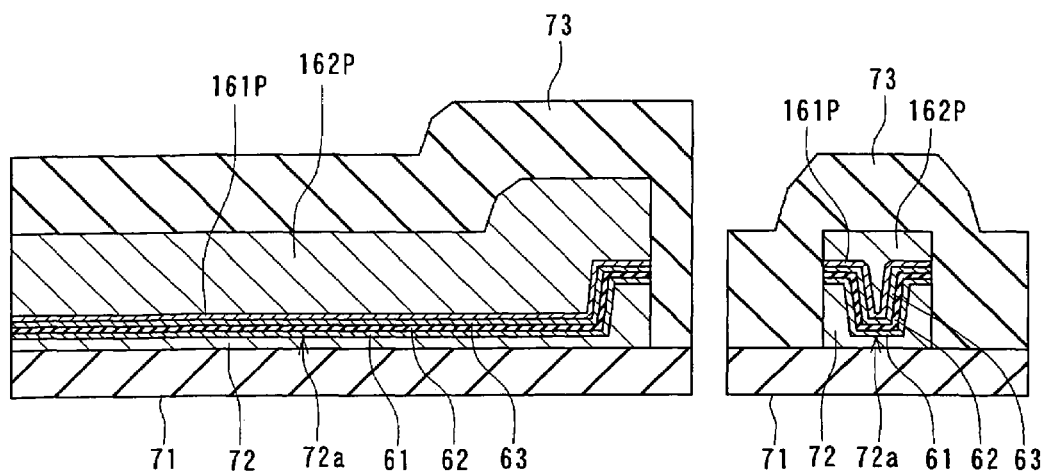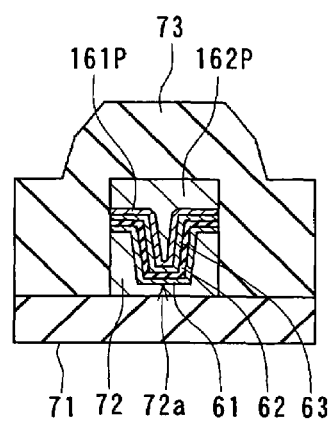
FIG. 37A  FIG. 37B
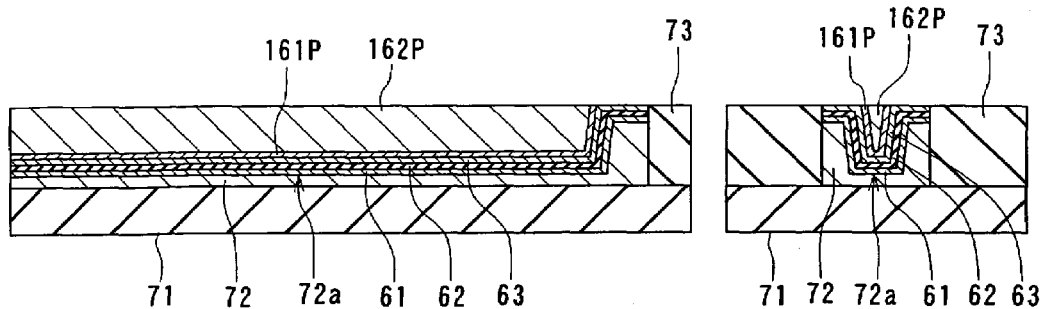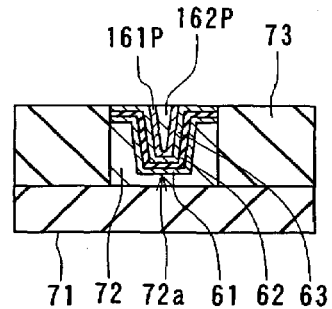
FIG. 38A  FIG. 38B

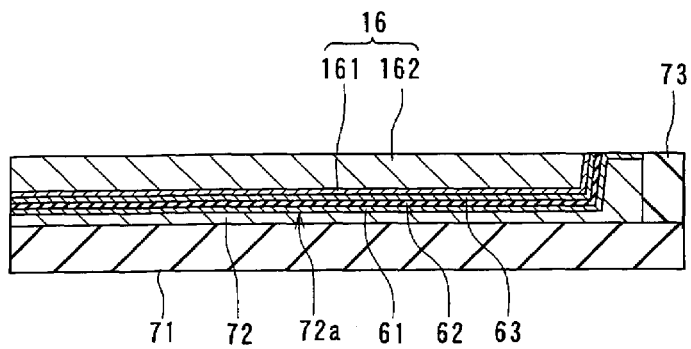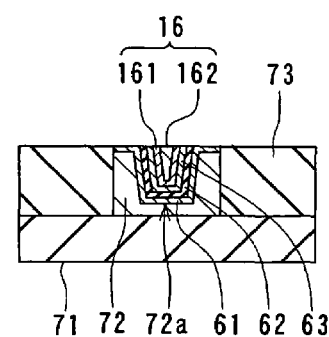
FIG. 39A  FIG. 39B
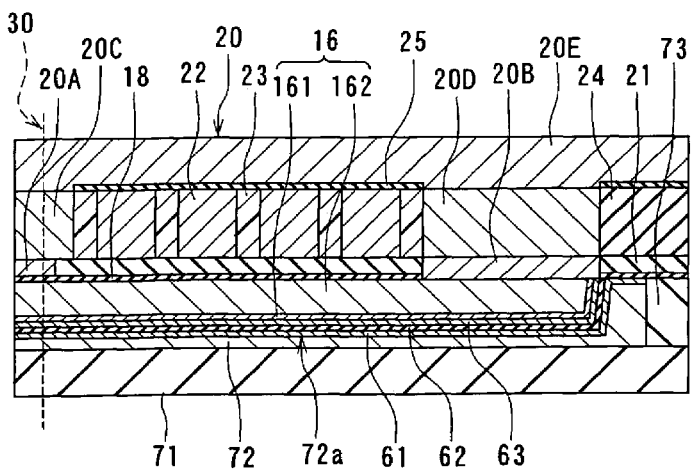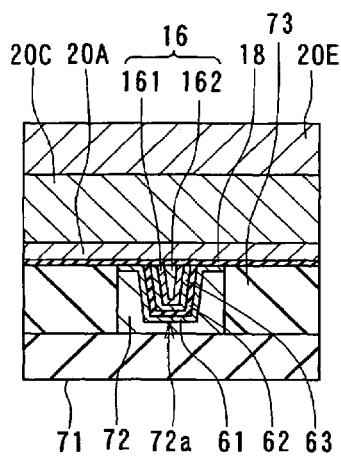
FIG. 40A  FIG. 40B

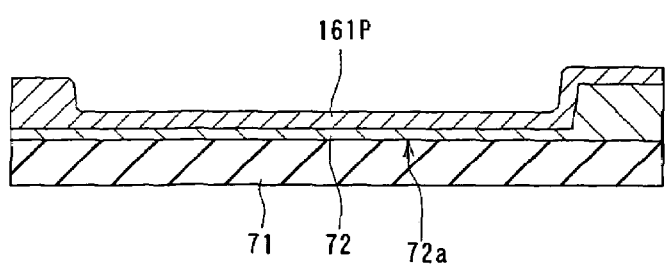
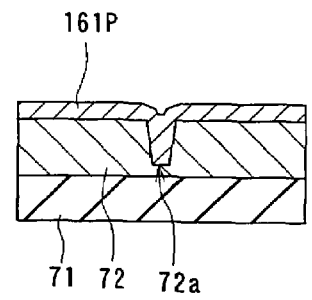
FIG. 41A FIG. 41B
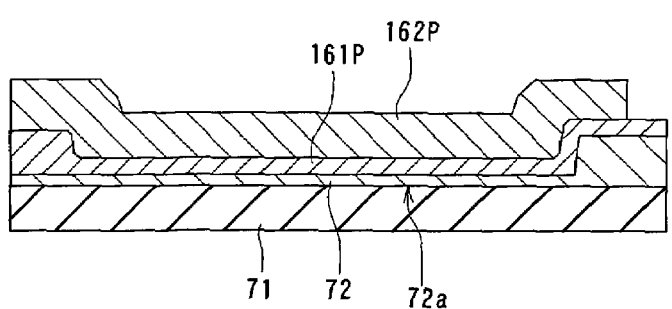
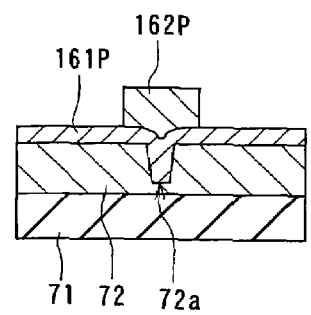
FIG. 42A FIG. 42B
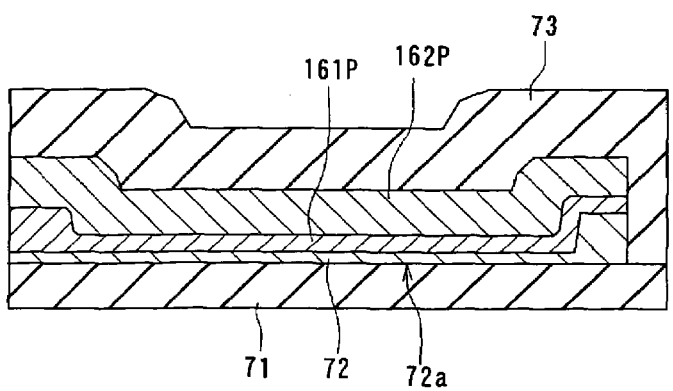
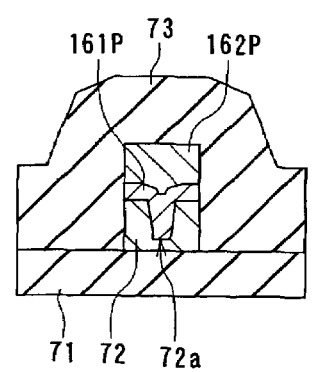
FIG. 43A FIG. 43B

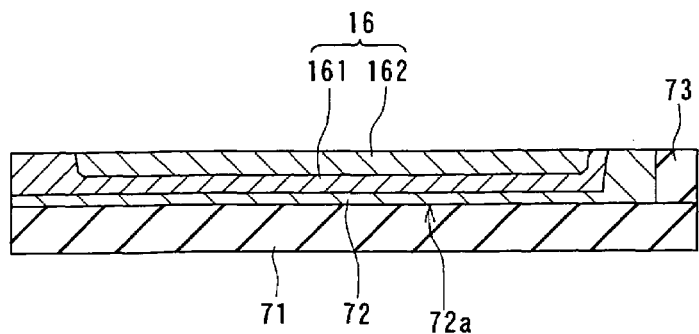
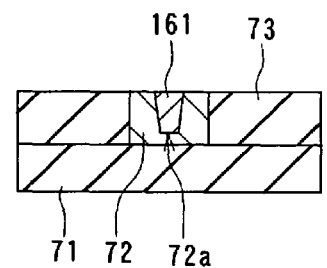
FIG. 44A  FIG. 44B
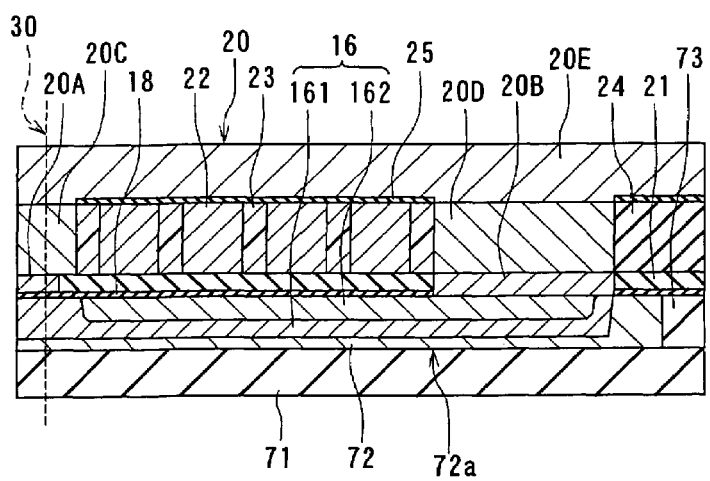
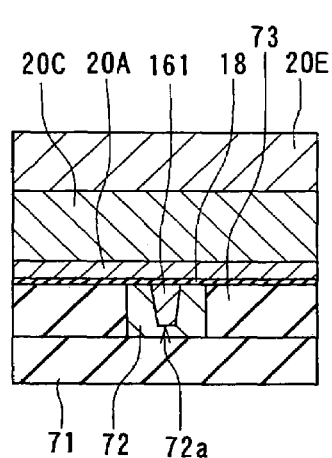
FIG. 45A  FIG. 45B

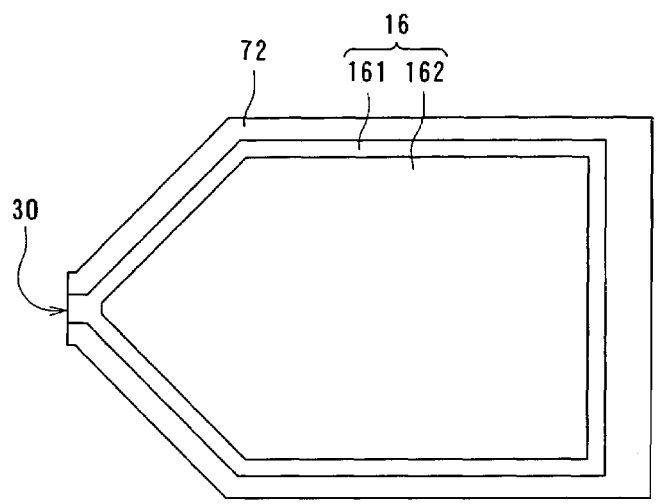
FIG. 46
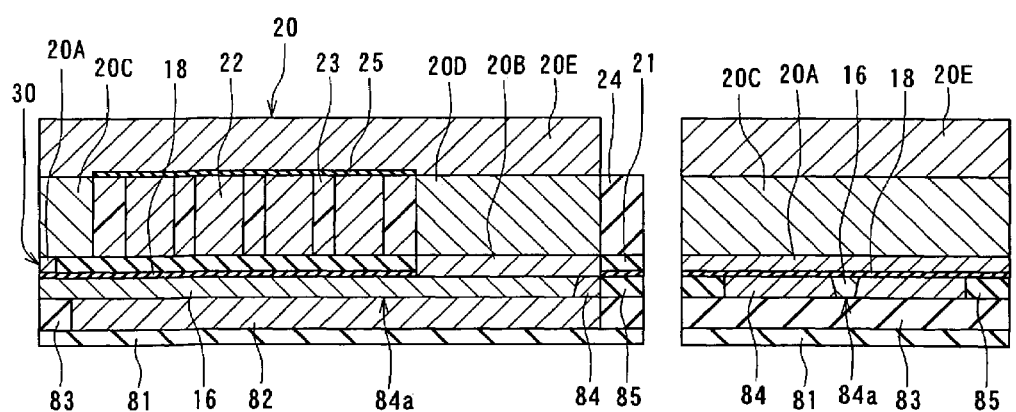
FIG. 47A
FIG. 47B

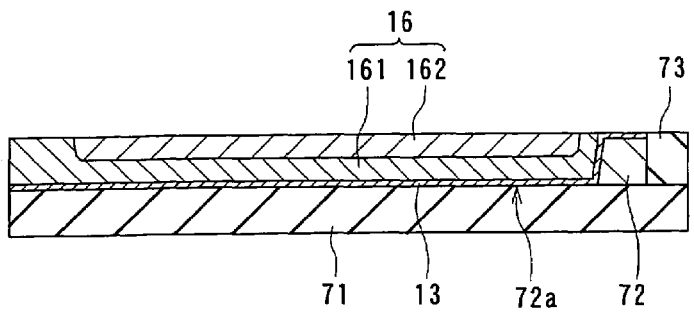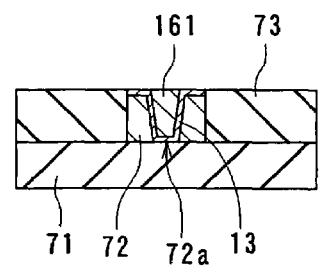
FIG. 50A  FIG. 50B
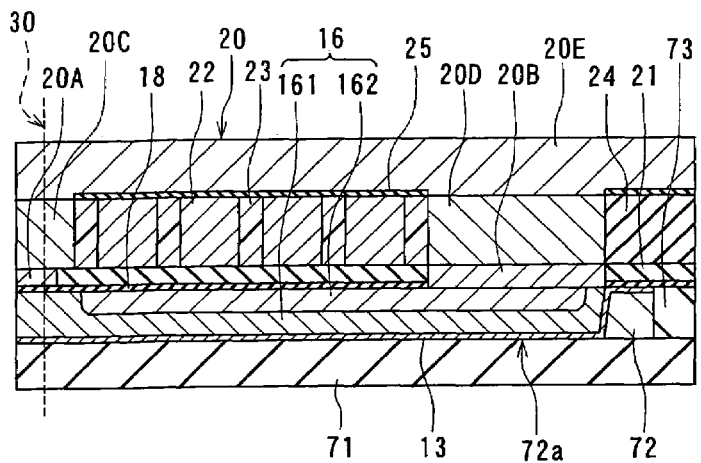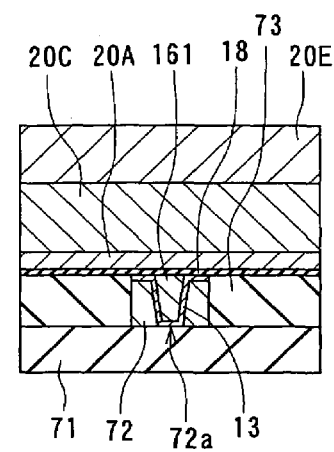
FIG. 51A  FIG. 51B

MAGNETIC HEAD FOR PERPENDICULAR MAGNETIC RECORDING AND METHOD OF MANUFACTURING SAME

BACKGROUND OF THE INVENTION

1. Field of the Invention

The present invention relates to a magnetic head for perpendicular magnetic recording that is used for writing data on a recording medium by using a perpendicular magnetic recording system and to a method of manufacturing such a magnetic head.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared with the longitudinal magnetic recording system.

As magnetic heads for longitudinal magnetic recording, magnetic heads for perpendicular magnetic recording typically used have a structure in which a reproducing (read) head having a magnetoresistive element (that may be hereinafter called an MR element) for reading and a recording (write) head having an induction-type electromagnetic transducer for writing are stacked on a substrate. The write head comprises a magnetic pole layer that produces a magnetic field in the direction orthogonal to the surface of the recording medium. The pole layer incorporates a track width defining portion and a wide portion, for example. The track width defining portion has an end located in a medium facing surface that faces toward the recording medium. The wide portion is coupled to the other end of the track width defining portion and has a width greater than the width of the track width defining portion. The track width defining portion has a nearly uniform width.

For the perpendicular magnetic recording system, it is an improvement in recording medium and an improvement in write head that mainly contributes to an improvement in recording density. It is a reduction in track width and an improvement in writing characteristics that is particularly required for the write head to achieve higher recording density. On the other hand, if the track width is reduced, the writing characteristics, such as an overwrite property that is a parameter indicating an overwriting capability, are reduced. It is therefore required to achieve better writing characteristics as the track width is reduced. Here, the length of the track width defining portion orthogonal to the medium facing surface is called a neck height. The smaller the neck height, the better is the overwrite property.

A magnetic head used for a magnetic disk drive such as a hard disk drive is typically provided in a slider. The slider has the above-mentioned medium facing surface. This medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt called a skew of the magnetic head is created with respect to the tangent of the circular track, in accordance with the position of the magnetic head across the tracks.

In a magnetic disk drive of the perpendicular magnetic recording system that exhibits a better capability of writing on a recording medium than the longitudinal magnetic recording system, in particular, if the above-mentioned skew is created, problems arise, such as a phenomenon in which data stored on an adjacent track is erased when data is written on a specific track (that is hereinafter called adjacent track erasing) or unwanted writing is performed between adjacent two tracks. To achieve higher recording density, it is required to suppress adjacent track erasing. Unwanted writing between adjacent two tracks affects detection of servo signals for alignment of the magnetic head and the signal-to-noise ratio of a read signal.

A technique is known for preventing the problems resulting from the skew as described above, as disclosed in the Published U.S. Patent Application No. 2003/0151850A1, the Published Unexamined Japanese Patent Application 2003-203311, and the U.S. Pat. No. 6,504,675B1, for example. According to this technique, the end of the track width defining portion located in the medium facing surface is made to have a shape in which the side located backward in the direction of travel of the recording medium (that is, the side located on the air-inflow-end side of the slider) is smaller than the other side. Typically, in the medium facing surface of a magnetic head, the end farther from the substrate is located forward in the direction of travel of the recording medium (that is, the side located on the air-outflow-end side of the slider). Therefore, the shape of the end of the track width defining portion located in the medium facing surface mentioned above is such that the side closer to the substrate is smaller than the side farther from the substrate.

As a magnetic head for perpendicular magnetic recording, a magnetic head comprising a pole layer and a shield is known, as disclosed in the U.S. Pat. No. 4,656,546, for example. In the medium facing surface of this magnetic head, an end of the shield is located forward of an end of the pole layer along the direction of travel of the recording medium with a specific small space. Such a magnetic head will be hereinafter called a shield-type head. In the shield-type head the shield prevents a magnetic flux from reaching the recording medium, the flux being generated from the end of the pole layer and extending in directions except the direction orthogonal to the surface of the recording medium. The shield-type head achieves a further improvement in linear recording density.

The U.S. Pat. No. 4,672,493 discloses a magnetic head having a structure in which magnetic layers are provided forward and backward, respectively, in the direction of travel of the recording medium with respect to a middle magnetic layer to be the pole layer, and coils are disposed between the middle magnetic layer and the forward magnetic layer, and between the middle magnetic layer and the backward magnetic layer, respectively. This magnetic head is capable of increasing components orthogonal to the surface of the recording medium among components of the magnetic field generated from the medium-facing-surface-side end of the middle magnetic layer.

Consideration will now be given to a method of forming a pole layer whose end located in the medium facing surface has a shape in which the side closer to the substrate is smaller than the side farther from the substrate, as mentioned above. In prior art, frame plating has been often employed as a method of forming such a pole layer. According to the method of forming the pole layer by frame plating, an electrode film is first formed on a base layer for the pole layer. Next, a photoresist layer is formed on the electrode film. The photoresist layer is then patterned to form a frame having a groove whose shape corresponds to the pole layer. Next, plating is performed by feeding a current to the electrode film to form the pole layer in the groove. The frame is then removed. Next, portions of the electrode film except the portion below the pole layer are removed. This method of forming the pole layer by frame plating has the following problem.

As the track width is reduced, the length of the side of the end of the track width defining portion closer to the substrate becomes closer to zero. As a result, it is impossible to grow the plating layer to be the track width defining portion on the electrode film. Therefore, the problem is that it is difficult to reduce the track width when the pole layer is formed by frame plating.

To solve this problem, it is possible that, after forming the pole layer by frame plating, both side portions of the track width defining portion are etched by dry etching such as ion beam etching so as to reduce the track width. According to this method, however, the length of the side of the end of the track width defining portion closer to the substrate becomes closer to zero as the track width is reduced, and the track width defining portion may be thereby broken down. It is thus difficult to reduce the track width by this method, too.

To form the pole layer by frame plating, it is required to remove portions of the electrode film except the portion below the pole layer after the pole layer is formed. This removal of the electrode film is performed by dry etching such as ion beam etching. When this removal is performed, both side portions of the pole layer are etched, too. As a result, the neck height becomes greater than a desired height, or the pole layer goes out of a desired shape. Also in the case where the pole layer is formed by frame plating and then both side portions of the track width defining portion are etched to reduce the track width as described above, the neck height becomes greater than a desired height, or the pole layer goes out of a desired shape. If the neck height is greater than a desired height, or if the pole layer goes out of a desired shape as mentioned above, the overwrite property is reduced.

When frame plating is employed to form the pole layer, the pole layer is polished, after it is formed, by chemical mechanical polishing (hereinafter referred to as CMP), for example, to flatten the top surface of the pole layer and to make the pole layer have a desired thickness. Here, both side portions of the track width defining portion are tilted with respect to the direction orthogonal to the substrate surface. Therefore, if the point at which polishing of the pole layer is stopped varies, the track width varies. For example, it is assumed that an angle of 7 degrees is formed between the direction orthogonal to the substrate surface and each of the side portions of the track width defining portion. In this case, if the point at which polishing of the pole layer is stopped is shifted by 0.05 µm, the track width varies by 0.0123 µm. As another example, it is assumed that an angle of 10 degrees is formed between the direction orthogonal to the substrate surface and each of the side portions of the track width defining portion. In this case, if the point at which polishing of the pole layer is stopped is shifted by 0.05 µm, the track width varies by 0.0176 µm.

The Published U.S. Patent Application No. 2003/0151850A1 discloses a method in which a groove having a shape corresponding to the pole layer is formed in an inorganic insulating film, and the pole layer is formed in the groove by plating or sputtering. In this method the width of the pole layer, that is, the track width, is defined by the width of the groove formed in the inorganic insulating film. Therefore, it is required to reduce the width of the groove to reduce the track width. However, this method has a problem that it is difficult to form a groove having a shape corresponding to the pole layer and having a small width in the inorganic insulating film.

OBJECT AND SUMMARY OF THE INVENTION

It is an object of the invention to provide a magnetic head for perpendicular magnetic recording that has a shape capable of preventing problems resulting from the skew and allows a pole layer having a small width to be formed with accuracy, and to provide a method of manufacturing such a magnetic head.

Each of first to fourth magnetic heads for perpendicular magnetic recording of the invention comprises: a medium facing surface that faces toward a recording medium; a coil for generating a magnetic field corresponding to data to be written on the recording medium; a pole layer having an end located in the medium facing surface, allowing a magnetic flux corresponding to the field generated by the coil to pass therethrough, and generating a write magnetic field for writing the data on the recording medium through the use of a perpendicular magnetic recording system; and a substrate on which the pole layer and the coil are stacked. The end of the pole layer located in the medium facing surface has: a first side close to the substrate; a second side located opposite to the first side; a third side connecting an end of the first side to an end of the second side; and a fourth side connecting the other end of the first side to the other end of the second side. The second side defines a track width. The end of the pole layer located in the medium facing surface has a width that decreases as the distance from the first side decreases.

The first magnetic head of the invention further comprises: a pole-layer-encasing layer made of a nonmagnetic material and having a groove in which the pole layer is placed; and a nonmagnetic film made of a nonmagnetic insulating material or a nonmagnetic semiconductor material and disposed in the groove between the encasing layer and the pole layer.

In the first magnetic head of the invention, the pole-layer-encasing layer may be made of a nonmagnetic insulating material or a nonmagnetic conductive material. The nonmagnetic film may be made of any of alumina, silicon oxide, silicon oxynitride, polycrystalline silicon, and amorphous silicon.

In the first magnetic head of the invention, the pole layer may incorporate: a first layer located closer to a surface of the groove; and a second layer located farther from the surface of the groove.

The first magnetic head of the invention may further comprise a nonmagnetic conductive film disposed between the nonmagnetic film and the pole layer.

The first magnetic head of the invention may further comprise a nonmagnetic conductive film disposed between the surface of the groove and the nonmagnetic film. In this case, the magnetic head may further comprise a second nonmagnetic conductive film disposed between the nonmagnetic film and the pole layer.

The second magnetic head of the invention comprises: a pole-layer-encasing layer made of a nonmagnetic conductive material and having a groove in which the pole layer is placed; and a nonmagnetic film provided in the groove between the encasing layer and the pole layer.

In the second magnetic head of the invention, the nonmagnetic film may be made of a nonmagnetic conductive material. The pole layer may incorporate: a first layer located closer to a surface of the groove; and a second layer located farther from the surface of the groove.

The third magnetic head of the invention comprises: a pole-layer-encasing layer made of a nonmagnetic insulating material and having a groove in which the pole layer is placed; and a nonmagnetic conductive film disposed in the groove between the encasing layer and the pole layer. The pole layer incorporates: a first layer located closer to a surface of the groove; and a second layer located farther from the surface of the groove.

The fourth magnetic head of the invention comprises: a pole-layer-encasing layer made of a nonmagnetic conductive material and having a groove in which the pole layer is placed. In the fourth magnetic head of the invention, the pole layer may incorporate: a first layer located closer to a surface of the groove; and a second layer located farther from the surface of the groove.

Each of first to sixth methods of manufacturing a magnetic head for perpendicular magnetic recording of the invention is provided for manufacturing a magnetic head comprising: a medium facing surface that faces toward a recording medium; a coil for generating a magnetic field corresponding to data to be written on the recording medium; a pole layer having an end located in the medium facing surface, allowing a magnetic flux corresponding to the field generated by the coil to pass therethrough, and generating a write magnetic field for writing the data on the recording medium through the use of a perpendicular magnetic recording system; and a substrate on which the pole layer and the coil are stacked, wherein: the end of the pole layer located in the medium facing surface has: a first side close to the substrate; a second side located opposite to the first side; a third side connecting an end of the first side to an end of the second side; and a fourth side connecting the other end of the first side to the other end of the second side; the second side defines a track width; and the end of the pole layer located in the medium facing surface has a width that decreases as a distance from the first side decreases.

The first method of the invention comprises the steps of: forming a pole-layer-encasing layer made of a nonmagnetic material and having a groove in which the pole layer is placed; forming a nonmagnetic film made of a nonmagnetic insulating material or a nonmagnetic semiconductor material in the groove; forming the pole layer in the groove after the nonmagnetic film is formed, such that the nonmagnetic film is disposed between the encasing layer and the pole layer; and forming the coil.

In the first method of the invention, the pole-layer-encasing layer may be made of a nonmagnetic insulating material or a nonmagnetic conductive material.

In the first method of the invention, the nonmagnetic film may be made of any of alumina, silicon oxide, silicon oxynitride, polycrystalline silicon, and amorphous silicon. The nonmagnetic film may be formed by chemical vapor deposition or formed by chemical vapor deposition in which formation of a single atomic layer is repeated.

In the first method of the invention, the pole layer may be made to incorporate: a first layer located closer to a surface of the groove; and a second layer located farther from the surface of the groove. In addition, the step of forming the pole layer may include the step of forming the first layer and the step of forming the second layer. In this case, the first layer may be formed by sputtering or ion beam deposition. The second layer may be formed by plating.

The first method of the invention may further comprise the step of forming a nonmagnetic conductive film disposed between the nonmagnetic film and the pole layer, the step being performed after the nonmagnetic film is formed and before the pole layer is formed. In this case, the nonmagnetic conductive film may be formed by any of chemical vapor deposition, sputtering, and ion beam deposition.

The first method of the invention may further comprise the step of forming a nonmagnetic conductive film disposed between the surface of the groove and the nonmagnetic film, the step being performed after the pole-layer-encasing layer is formed and before the nonmagnetic film is formed. In this case, the nonmagnetic conductive film may be formed by any of chemical vapor deposition, sputtering, and ion beam deposition. The first method of the invention may further comprise the step of forming a second nonmagnetic conductive film disposed between the nonmagnetic film and the pole layer, the step being performed after the nonmagnetic film is formed and before the pole layer is formed. In this case, the second nonmagnetic conductive film may be formed by any of chemical vapor deposition, sputtering, and ion beam deposition.

The second method of the invention comprises the steps of: forming a pole-layer-encasing layer made of a nonmagnetic conductive material and having a groove in which the pole layer is placed; forming a nonmagnetic film in the groove; forming the pole layer in the groove after the nonmagnetic film is formed, such that the nonmagnetic film is disposed between the encasing layer and the pole layer; and forming the coil.

In the second method of the invention, the nonmagnetic film may be made of a nonmagnetic conductive material. In this case, the nonmagnetic film may be formed by any of chemical vapor deposition, sputtering, and ion beam deposition.

In the second method of the invention, the pole layer may be made to incorporate: a first layer located closer to a surface of the groove; and a second layer located farther from the surface of the groove. In addition, the step of forming the pole layer may include the step of forming the first layer and the step of forming the second layer. In this case, the first layer may be formed by sputtering or ion beam deposition. The second layer may be formed by plating.

The third method of the invention comprises the steps of: forming a pole-layer-encasing layer made of a nonmagnetic insulating material and having a groove in which the pole layer is placed; forming a nonmagnetic conductive film in the groove; forming the pole layer in the groove after the nonmagnetic conductive film is formed, such that the nonmagnetic conductive film is disposed between the encasing layer and the pole layer; and forming the coil, wherein: the pole layer is made to incorporate: a first layer located closer to a surface of the groove; and a second layer located farther from the surface of the groove; and the step of forming the pole layer includes the step of forming the first layer and the step of forming the second layer.

In the third method of the invention, the nonmagnetic conductive film may be formed by any of chemical vapor deposition, sputtering, and ion beam deposition. The first layer may be formed by sputtering or ion beam deposition. The second layer may be formed by plating.

The fourth method of the invention comprises the steps of: forming a pole-layer-encasing layer made of a nonmagnetic material and having a groove in which the pole layer is placed; forming a nonmagnetic conductive film in the groove and on a top surface of the pole-layer-encasing layer; forming a magnetic layer to be the pole layer in the groove and on the top surface of the pole-layer-encasing layer after the nonmagnetic conductive film is formed, such that the nonmagnetic conductive film is disposed between the encasing layer and the pole layer; polishing the magnetic layer until the nonmagnetic conductive film is exposed, so that the magnetic layer becomes the pole layer; and forming the coil.

In the fourth method of the invention, the magnetic layer may be polished by chemical mechanical polishing. The nonmagnetic conductive film may be formed by any of chemical vapor deposition, sputtering, and ion beam deposition.

In the fourth method of the invention, the pole layer may be made to incorporate: a first layer located closer to a surface of the groove; and a second layer located farther from the surface of the groove. In addition, the step of forming the magnetic layer may include the step of forming a first magnetic layer to be the first layer and the step of forming a second magnetic layer to be the second layer on the first magnetic layer. In this case, the first magnetic layer may be formed by sputtering or ion beam deposition. The second magnetic layer may be formed by plating.

The fourth method of the invention may further comprise the step of forming a nonmagnetic film made of a nonmagnetic insulating material or a nonmagnetic semiconductor material and disposed between the nonmagnetic conductive film and the magnetic layer, the step being performed after the nonmagnetic conductive film is formed and before the magnetic layer is formed. The nonmagnetic film may be made of any of alumina, silicon oxide, silicon oxynitride, polycrystalline silicon, and amorphous silicon. The nonmagnetic film may be formed by chemical vapor deposition or formed by chemical vapor deposition in which formation of a single atomic layer is repeated. The fourth method of the invention may further comprise the step of forming a second nonmagnetic conductive film disposed between the nonmagnetic film and the magnetic layer, the step being performed after the nonmagnetic film is formed and before the magnetic layer is formed. In this case, the step of polishing the magnetic layer may include: a first polishing step of polishing the magnetic layer until the second nonmagnetic conductive film is exposed; and a second polishing step of polishing the magnetic layer until the primary nonmagnetic conductive film formed on the top surface of the encasing layer is exposed. The second nonmagnetic conductive film may be formed by any of chemical vapor deposition, sputtering, and ion beam deposition.

The fifth method of the invention comprises the steps of: forming a pole-layer-encasing layer made of a nonmagnetic conductive material and having a groove in which the pole layer is placed; forming the pole layer in the groove; and forming the coil.

In the fifth method of the invention, the pole layer may be made to incorporate: a first layer located closer to a surface of the groove; and a second layer located farther from the surface of the groove. In this case, the first layer may be formed by sputtering or ion beam deposition. The second layer may be formed by plating.

In the fifth method of the invention, the step of forming the pole layer may include the steps of: forming a first magnetic layer to be the first layer in the groove and on a top surface of the pole-layer-encasing layer; forming a patterned second magnetic layer to be the second layer on the first magnetic layer; selectively etching the first magnetic layer and the encasing layer, using the second magnetic layer as a mask; and polishing the first and second magnetic layers such that portions of the first and second magnetic layers located on the top surface of the encasing layer are removed and the pole layer is thereby made up of the first and second magnetic layers. In this case, the first and second magnetic layers may be polished by chemical mechanical polishing.

In the fifth method of the invention, the step of forming the pole layer may include the steps of forming a first magnetic layer to be the first layer in the groove and on a top surface of the pole-layer-encasing layer; forming a second magnetic layer to be the second layer on the first magnetic layer; and polishing the first and second magnetic layers until the encasing layer is exposed, such that portions of the first and second magnetic layers located on the top surface of the encasing layer are removed and the pole layer is thereby made up of the first and second magnetic layers. In this case, the first and second magnetic layers may be polished by chemical mechanical polishing.

The sixth method of the invention comprises the steps of: forming a pole-layer-encasing layer made of a nonmagnetic insulating material and having a groove in which the pole layer is placed; forming a nonmagnetic conductive film in the groove by chemical vapor deposition; forming the pole layer in the groove after the nonmagnetic conductive film is formed, such that the nonmagnetic conductive film is disposed between the encasing layer and the pole layer; and forming the coil.

According to the first magnetic head of the invention, the pole layer is disposed in the groove of the pole-layer-encasing layer made of a nonmagnetic material, with the nonmagnetic film made of a nonmagnetic insulating material or a nonmagnetic semiconductor material provided between the encasing layer and the pole layer. Consequently, the pole layer has a width smaller than the width of the groove. It is thereby possible to easily form the groove and to easily reduce the width of the pole layer. As a result, according to the invention, it is possible to form the pole layer with accuracy that has a small width and a shape capable of preventing problems resulting from the skew.

According to the second magnetic head of the invention, the pole layer is disposed in the groove of the pole-layer-encasing layer made of a nonmagnetic conductive material, with the nonmagnetic film provided between the encasing layer and the pole layer. Consequently, the pole layer has a width smaller than the width of the groove. It is thereby possible to easily form the groove and to easily reduce the width of the pole layer. As a result, according to the invention, it is possible to form the pole layer with accuracy that has a small width and a shape capable of preventing problems resulting from the skew.

According to the third magnetic head of the invention, the pole layer is disposed in the groove of the pole-layer-encasing layer made of a nonmagnetic insulating material, with the nonmagnetic conductive film provided between the encasing layer and the pole layer. Consequently, the pole layer has a width smaller than the width of the groove. It is thereby possible to easily form the groove and to easily reduce the width of the pole layer. Furthermore, according to the invention, the pole layer incorporates: the first layer located closer to the surface of the groove; and the second layer located farther from the surface of the groove. As a result, it is possible to form the pole layer with accuracy even if the groove has a small width. These features of the invention make it possible to form the pole layer with accuracy that has a small width and a shape capable of preventing problems resulting from the skew.

According to the fourth magnetic head of the invention, the pole layer is disposed in the groove of the pole-layer-encasing layer made of a nonmagnetic conductive material. According to the invention, the encasing layer made of the nonmagnetic conductive material can be used as an electrode for plating when the pole layer is formed by plating. It is thereby possible to form the pole layer with accuracy even if the groove has a small width. According to the invention, the thickness of the pole layer is controlled with accuracy by polishing the top surface of the pole layer until the encasing layer is exposed. These features of the invention make it possible to form the pole layer with accuracy that has a small width and a shape capable of preventing problems resulting from the skew.

According to the first method of manufacturing the magnetic head for perpendicular magnetic recording of the invention, the pole layer is formed in the groove of the pole-layer-encasing layer made of a nonmagnetic material, with the nonmagnetic film made of a nonmagnetic insulating material or a nonmagnetic semiconductor material provided between the encasing layer and the pole layer. Consequently, the pole layer has a width smaller than the width of the groove. It is thereby possible to easily form the groove and to easily reduce the width of the pole layer. As a result, according to the invention, it is possible to form the pole layer with accuracy that has a small width and a shape capable of preventing problems resulting from the skew.

According to the second method of the invention, the pole layer is formed in the groove of the pole-layer-encasing layer made of a nonmagnetic conductive material, with the nonmagnetic film provided between the encasing layer and the pole layer. Consequently, the pole layer has a width smaller than the width of the groove. It is thereby possible to easily form the groove and to easily reduce the width of the pole layer. As a result, according to the invention, it is possible to form the pole layer with accuracy that has a small width and a shape capable of preventing problems resulting from the skew.

According to the third method of the invention, the pole layer is formed in the groove of the pole-layer-encasing layer made of a nonmagnetic insulating material, with the nonmagnetic conductive film provided between the encasing layer and the pole layer. Consequently, the pole layer has a width smaller than the width of the groove. It is thereby possible to easily form the groove and to easily reduce the width of the pole layer. Furthermore, according to the invention, the pole layer is made to incorporate: the first layer located closer to the surface of the groove; and the second layer located farther from the surface of the groove. As a result, it is possible to form the pole layer with accuracy even if the groove has a small width. These features of the invention make it possible to form the pole layer with accuracy that has a small width and a shape capable of preventing problems resulting from the skew.

According to the fourth method of the invention, the pole layer is formed in the groove of the pole-layer-encasing layer made of a nonmagnetic material, with the nonmagnetic conductive film provided between the encasing layer and the pole layer. Consequently, the pole layer has a width smaller than the width of the groove. It is thereby possible to easily form the groove and to easily reduce the width of the pole layer. Furthermore, according to the invention, the magnetic layer to be the pole layer is formed in the groove and on the top surface of the encasing layer after the nonmagnetic conductive film is formed, and the magnetic layer is polished until the nonmagnetic conductive film is exposed, so that the magnetic layer becomes the pole layer. It is thereby possible to control the thickness of the pole layer with accuracy. These features of the invention make it possible to form the pole layer with accuracy that has a small width and a shape capable of preventing problems resulting from the skew.

According to the fifth method of the invention, the pole layer is formed in the groove of the pole-layer-encasing layer made of a nonmagnetic conductive material. According to the invention, the encasing layer made of the nonmagnetic conductive material can be used as an electrode for plating when the pole layer is formed by plating. It is thereby possible to form the pole layer with accuracy even if the groove has a small width. Furthermore, according to the invention, the thickness of the pole layer is controlled with accuracy by polishing the top surface of the pole layer until the nonmagnetic conductive film is exposed. These features of the invention make it possible to form the pole layer with accuracy that has a small width and a shape capable of preventing problems resulting from the skew.

According to the sixth method of the invention, the pole layer is formed in the groove of the pole-layer-encasing layer made of a nonmagnetic insulating material, with the nonmagnetic conductive film provided between the encasing layer and the pole layer. Consequently, the pole layer has a width smaller than the width of the groove. It is thereby possible to easily form the groove and to easily reduce the width of the pole layer. These features of the invention make it possible to form the pole layer with accuracy that has a small width and a shape capable of preventing problems resulting from the skew.

Other and further objects, features and advantages of the invention will appear more fully from the following description.

BRIEF DESCRIPTION OF THE DRAWINGS

FIG. 4A and FIG. 4B are views for illustrating a step of a method of manufacturing the magnetic head of the first embodiment of the invention.

FIG. 5A and FIG. 5B are views for illustrating a step that follows the step shown in FIG. 4A and FIG. 4B.

FIG. 6A and FIG. 6B are views for illustrating a step that follows the step shown in FIG. 5A and FIG. 5B.

FIG. 10A and FIG. 10B are views for illustrating a step that follows the step shown in FIG. 9A and FIG. 9B.

FIG. 11A and FIG. 11B are views for illustrating a step that follows the step shown in FIG. 10A and FIG. 10B.

FIG. 14A and FIG. 14B are views for illustrating a step of a method of manufacturing a magnetic head of a second embodiment of the invention.

FIG. 15A and FIG. 15B are views for illustrating a step that follows the step shown in FIG. 14A and FIG. 14B.

FIG. 16A and FIG. 16B are views for illustrating a step that follows the step shown in FIG. 15A and FIG. 15B.

FIG. 24A and FIG. 24B are views for illustrating a step that follows the step shown in FIG. 23A and FIG. 23B.

FIG. 25A and FIG. 25B are views for illustrating a step that follows the step shown in FIG. 24A and FIG. 24B.

FIG. 26A and FIG. 26B are views for illustrating a step of a method of manufacturing a magnetic head of a fourth embodiment of the invention.

FIG. 27A and FIG. 27B are views for illustrating a step that follows the step shown in FIG. 26A and FIG. 26B.

FIG. 28A and FIG. 28B are views for illustrating a step that follows the step shown in FIG. 27A and FIG. 27B.

FIG. 29A and FIG. 29B are views for illustrating a step that follows the step shown in FIG. 28A and FIG. 28B.

FIG. 30A and FIG. 30B are views for illustrating a step that follows the step shown in FIG. 29A and FIG. 29B.

FIG. 33A and FIG. 33B are views for illustrating a step that follows the step shown in FIG. 32A and FIG. 32B.

FIG. 34A and FIG. 34B are views for illustrating a step that follows the step shown in FIG. 33A and FIG. 33B.

FIG. 37A and FIG. 37B are views for illustrating a step that follows the step shown in FIG. 36A and FIG. 36B.

FIG. 38A and FIG. 38B are views for illustrating a step that follows the step shown in FIG. 37A and FIG. 37B.

FIG. 39A and FIG. 39B are views for illustrating a step that follows the step shown in FIG. 38A and FIG. 38B.

FIG. 40A and FIG. 40B are views for illustrating a step that follows the step shown in FIG. 39A and FIG. 39B.

FIG. 41A and FIG. 41B are views for illustrating a step of a method of manufacturing a magnetic head of a seventh embodiment of the invention.

FIG. 42A and FIG. 42B are views for illustrating a step that follows the step shown in FIG. 41A and FIG. 41B.

FIG. 43A and FIG. 43B are views for illustrating a step that follows the step shown in FIG. 42A and FIG. 42B.

FIG. 44A and FIG. 44B are views for illustrating a step that follows the step shown in FIG. 43A and FIG. 43B.

FIG. 45A and FIG. 45B are views for illustrating a step that follows the step shown in FIG. 44A and FIG. 44B.

FIG. 46 is a top view of the pole-layer-encasing layer and the pole layer of the magnetic head of the seventh embodiment of the invention.

FIG. 47A and FIG. 47B are cross-sectional views for illustrating the main part of a magnetic head of an eighth embodiment of the invention.

FIG. 50A and FIG. 50B are views for illustrating a step that follows the step shown in FIG. 49A and FIG. 49B.

FIG. 51A and FIG. 51B are views for illustrating a step that follows the step shown in FIG. 50A and FIG. 50B.

DETAILED DESCRIPTION OF THE PREFERRED EMBODIMENTS

First Embodiment

Figure 1:
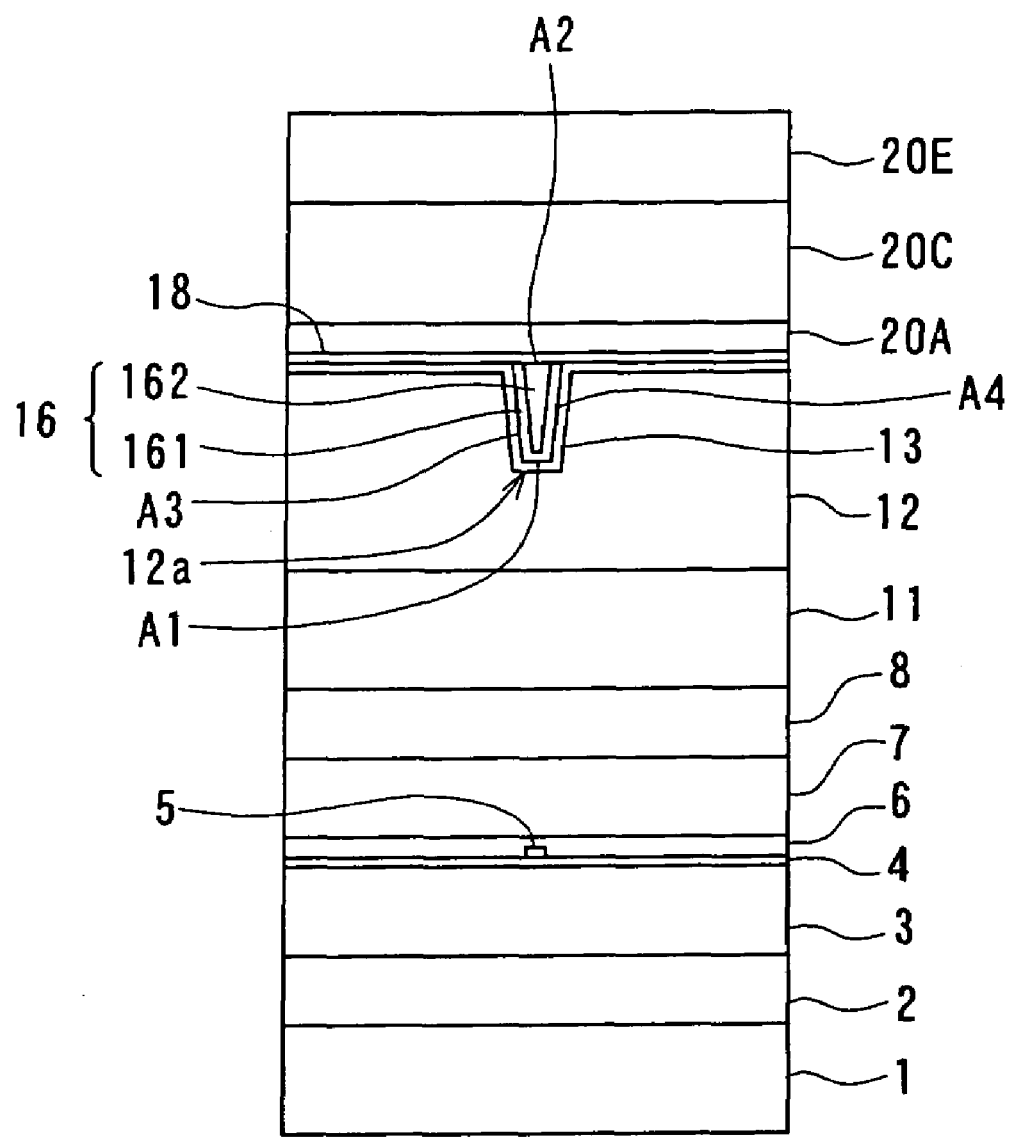
FIG. 1 is a front view of the medium facing surface of a magnetic head of a first embodiment of the invention.
Figure 2:
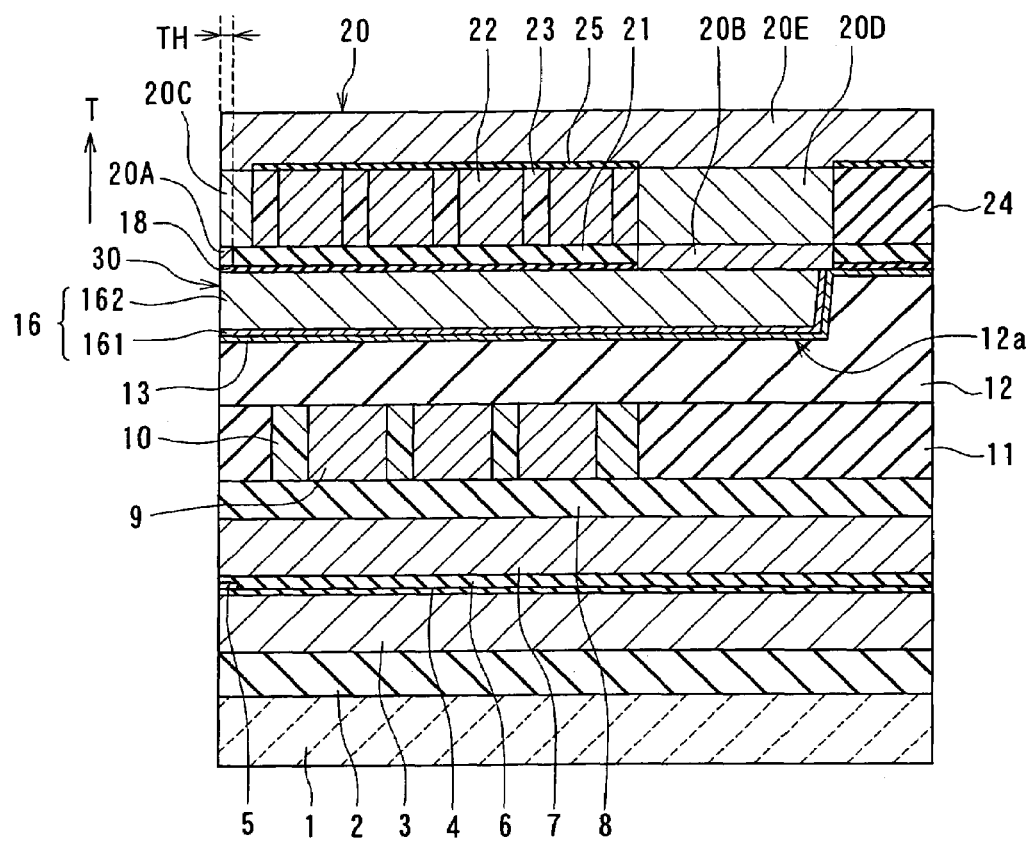
FIG. 2 is a cross-sectional view for illustrating the configuration of the magnetic head of the first embodiment of the invention.

Preferred embodiments of the invention will now be described in detail with reference to the accompanying drawings. Reference is now made to FIG. 1 and FIG. 2 to describe the configuration of a magnetic head for perpendicular magnetic recording of a first embodiment of the invention.

FIG. 1 is a front view for illustrating the medium facing surface of the magnetic head of the embodiment. FIG. 2 is a cross-sectional view for illustrating the configuration of the magnetic head of the embodiment. FIG. 2 illustrates a cross section orthogonal to the medium facing surface and a surface of a substrate. The arrow indicated with T in FIG. 2 shows the direction of travel of a recording medium.

As shown in FIG. 1 and FIG. 2, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a top shield layer 7 made of a magnetic material and disposed on the top shield gap film 6. The portion from the bottom shield layer 3 to the top shield layer 7 make up the read head.

The MR element 5 has an end that is located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element.

The magnetic head further comprises: an insulating layer 8 made of an insulating material and disposed on the top shield layer 7; a coil 9 formed on the insulating layer 8; an insulating layer 10 made of an insulating material and disposed around the coil 9 and in the space between adjacent ones of the turns of the coil 9; and an insulating layer 11 made of an insulating material and disposed around the insulating layer 10. The coil 9 is flat-whorl-shaped. The coil 9 and the insulating layers 10 and 11 have flattened top surfaces. The insulating layers 8 and 11 are made of alumina, for example. The insulating layer 10 is made of photoresist, for example. The coil 9 is made of a conductive material such as copper.

The magnetic head further comprises a pole-layer-encasing layer 12 made of a nonmagnetic insulating material and disposed on the flattened top surfaces of the coil 9 and the insulating layers 10 and 11. The pole-layer-encasing layer 12 has a groove 12a in which the pole layer described later is placed. Although the groove 12a does not penetrate the pole-layer-encasing layer 12 in FIG. 1 and FIG. 2, the groove 12a may penetrate the encasing layer 12. The encasing layer 12 may be made of any of alumina, silicon oxide ($SiO_x$), and silicon oxynitride (SiON), for example.

The magnetic head further comprises: a nonmagnetic conductive film 13 disposed in the groove 12a and on the top surface of the pole-layer-encasing layer 12; and the pole layer 16 disposed in the groove 12a, with the nonmagnetic conductive film 13 provided between the pole layer 16 and the encasing layer 12. The pole layer 16 incorporates: a first layer 161 located closer to the surface of the groove 12a; and a second layer 162 located farther from the surface of the groove 12a. The nonmagnetic conductive film 13 and the pole layer 16 have flattened top surfaces.

The nonmagnetic conductive film 13 is made of a nonmagnetic conductive material that may be any of Ta, Mo, W, Ti, Ru, Rh, Re, Pt, Pd, Ir, TiN, TiW and NiCr, for example.

Each of the first layer 161 and the second layer 162 is made of a magnetic material. The first layer 161 may be made of a magnetic material including Co and Fe, for example. To be specific, the first layer 161 may be made of CoFeN having a saturation flux density of 2.4 T, for example. The second layer 162 may be made of any of NiFe, CoNiFe and CoFe, for example.

The magnetic head further comprises a gap layer 18 disposed on the top surfaces of the nonmagnetic conductive film 13 and the pole layer 16. The gap layer 18 has an opening located at a distance from the medium facing surface 30. The gap layer 18 may be made of an insulating material such as alumina or a nonmagnetic metal material such as Ru, NiCu, Ta, W or NiB.

The magnetic head further comprises a shield layer 20. The shield layer 20 has: a first layer 20A disposed on the gap layer 18; a second layer 20C disposed on the first layer 20A; a coupling layer 20B disposed on a portion of the pole layer 16 where the opening of the gap layer 18 is formed; a coupling layer 20D disposed on the coupling layer 20B; and a third layer 20E disposed to couple the second layer 20C to the coupling layer 20D. The first layer 20A, the second layer 20C, the coupling layers 20B and 20D, and the third layer 20E are made of CoNiFe, for example.

The magnetic head further comprises a nonmagnetic layer 21 made of a nonmagnetic material and disposed around the coupling layer 20B. A portion of the nonmagnetic layer 21 is disposed on a side of the first layer 20A. The nonmagnetic layer 21 is made of an inorganic insulating material such as alumina or coating glass. Alternatively, the nonmagnetic layer 21 may be made up of a layer of a nonmagnetic metal material and a layer of an insulating material disposed thereon. In this case, the nonmagnetic metal material may be a refractory metal such as Ta, Mo, Nb, W, Cr, Ru, Cu or Ni.

The magnetic head further comprises: a coil 22 disposed on the nonmagnetic layer 21; an insulating layer 23 disposed around the coil 22 and in the space between adjacent ones of the turns of the coil 22; an insulating layer 24 disposed around the insulating layer 23; and an insulating layer 25 disposed on the coil 22 and the insulating layers 23 and 24. The coil 22 is flat-whorl-shaped. A portion of the coil 22 passes between the second layer 20C and the coupling layer 20D. The coil 22 is made of a conductive material such as copper. The second layer 20C, the coupling layer 20D and the insulating layer 23 have flattened top surfaces. The insulating layer 23 is made of photoresist, for example. The insulating layers 24 and 25 are made of alumina, for example.

The portion from the coil 9 to the third layer 20E of the shield layer 20 make up the write head. Although not shown, the magnetic head further comprises a protection layer for covering the shield layer 20.

As described so far, the magnetic head of the embodiment comprises the medium facing surface 30 that faces toward a recording medium, the read head, and the write head. The read head and the write head are stacked on the substrate 1. The read head is disposed backward in the direction T of travel of the recording medium (that is, on the air-inflow-end side of the slider). The write head is disposed forward in the direction T of travel of the recording medium (that is, on the air-outflow-end side of the slider).

The read head comprises the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further comprises: the bottom shield gap film 4 disposed between the MR element 5 and the bottom shield layer 3; and the top shield gap film 6 disposed between the MR element 5 and the top shield layer 7.

The write head comprises the coil 9, the pole-layer-encasing layer 12, the nonmagnetic conductive film 13, the pole layer 16, the gap layer 18, the shield layer 20, and the coil 22. The coils 9 and 22 generate a magnetic field corresponding to data to be written on the recording medium. The coil 9 is not a component requisite for the write head and may be omitted.

The pole layer 16 has an end located in the medium facing surface 30. The pole layer 16 allows the magnetic flux corresponding to the field generated by the coil 22 to pass therethrough and generates a write magnetic field for writing the data on the medium by using the perpendicular magnetic recording system.

The shield layer 20 has an end located in the medium facing surface 30, and has a portion located away from the medium facing surface 30 and coupled to the pole layer 16. The gap layer 18 is made of a nonmagnetic material and provided between the pole layer 16 and the shield layer 20.

In the medium facing surface 30, the end of the shield layer 20 is disposed forward of the end of the pole layer 16 along the direction T of travel of the recording medium with a specific space created by the thickness of the gap layer 18. At least part of the coil 22 is disposed between the pole layer 16 and the shield layer 20 and insulated from the pole layer 16 and the shield layer 20.

The shield layer 20 has: the first layer 20A disposed adjacent to the gap layer 18; the second layer 20C disposed on a side of the first layer 20A farther from the gap layer 18; the coupling layers 20B and 20D disposed on the portion of the pole layer 16 where the opening of the gap layer 18 is formed; and the third layer 20E disposed to couple the second layer 20C to the coupling layer 20D. The second layer 20C is disposed between the medium facing surface 30 and the at least part of the coil 22.

Figure 3:
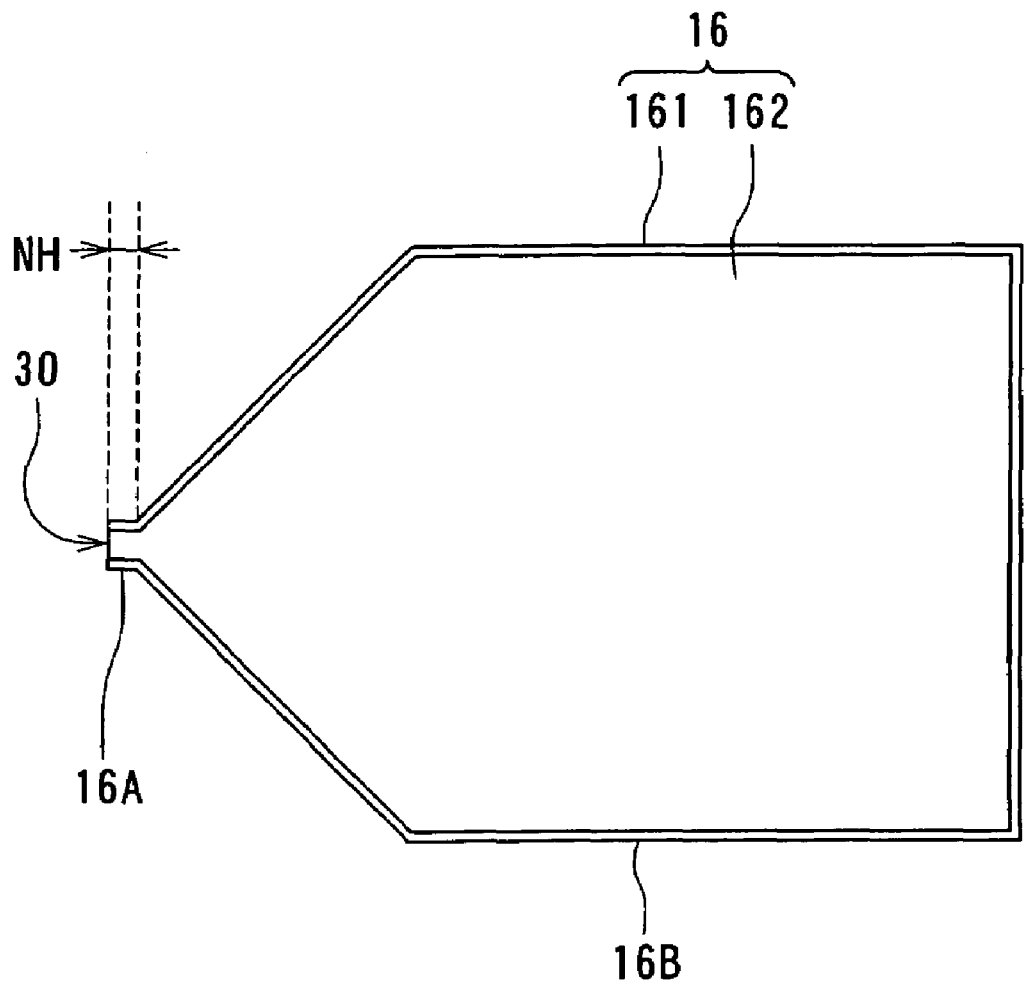
FIG. 3 is a top view of the pole layer of the magnetic head of the first embodiment of the invention.

FIG. 3 is a top view of the pole layer 16. As shown in FIG. 3, the pole layer 16 incorporates a track width defining portion 16A and a wide portion 16B. The track width defining portion 16A has an end located in the medium facing surface 30 and has a uniform width equal to the track width. The wide portion 16B is coupled to the other end of the track width defining portion 16A and has a width greater than the width of the track width defining portion 16A. The wide portion 16B is equal in width to the track width defining portion 16A at the interface with the track width defining portion 16A, and gradually increases in width as the distance from the medium facing surface 30 increases and then maintains a specific width to the end of the wide portion 16B. Here, the length of the track width defining portion 16A orthogonal to the medium facing surface 30 is called a neck height NH. The neck height NH falls within a range of 0.1 to 0.2 μm inclusive, for example.

As shown in FIG. 1, the end of the pole layer 16 located in the medium facing surface 30 has: a first side A1 close to the substrate 1; a second side A2 opposite to the first side A1; a third side A3 connecting an end of the first side A1 to an end of the second side A2; and a fourth side A4 connecting the other end of the first side A1 to the other end of the second side A2. The second side A2 defines the track width. The width of the end of the pole layer 16 located in the medium facing surface 30 decreases as the distance from the first side A1 decreases.

The length of the second side A2, that is, the track width, falls within a range of 0.08 to 0.12 μm inclusive, for example. The thickness of the pole layer 16 falls within a range of 0.20 to 0.30 μm inclusive, for example. Each of the third side A3 and the fourth side A4 forms an angle that falls within a range of 5 to 12 degrees inclusive, for example, with respect to the direction orthogonal to the top surface of the substrate 1. The thickness of the gap layer 18 falls within a range of 40 to 80 nm inclusive, for example.

The nonmagnetic conductive film 13 is disposed in the groove 12a of the pole-layer-encasing layer 12 and on the top surface of the encasing layer 12. The pole layer 16 is disposed in the groove 12a such that the nonmagnetic conductive film 13 is disposed between the pole-layer-encasing layer 12 and the pole layer 16. The pole layer 16 has: the first layer 161 located closer to the surface of the groove 12a; and the second layer 162 located farther from the surface of the groove 12a. The nonmagnetic conductive film 13 has a thickness that falls within a range of 20 to 50 nm inclusive, for example. The first layer 161 has a thickness that falls within a range of 30 to 60 nm inclusive, for example.

The first layer 20A of the shield layer 20 has: a first end located in the medium facing surface 30; and a second end opposite to the first end. The second layer 20C of the shield layer 20 also has: a first end located in the medium facing surface 30; and a second end opposite to the first end. The second end of the first layer 20A defines the throat height TH. That is, as shown in FIG. 2, the throat height TH is the minimum distance between the first end and the second end of the portion of the first layer 20A facing toward the pole layer 16 with the gap layer 18 disposed in between. The throat height TH falls within a range of 0.1 to 0.3 μm inclusive, for example. The minimum distance between the first end and the second end of the portion of the second layer 20C facing toward the pole layer 16 with the gap layer 18 and the first layer 20A disposed in between falls within a range of 0.5 to 0.8 μm inclusive, for example. The first layer 20A and the coupling layer 20B have a thickness that falls within a range of 0.3 to 0.5 μm inclusive, for example. The second layer 20C and the coupling layer 20D have a thickness that falls within a range of 2.5 to 3.0 μm inclusive, for example. The third layer 20E has a thickness that falls within a range of 2.0 to 3.0 μm inclusive, for example.

As shown in FIG. 2, the nonmagnetic layer 21 is disposed on a side of the first layer 20A. The nonmagnetic layer 21 has a thickness that is equal to or greater than the thickness of the first layer 20A and that falls within a range of 0.3 to 0.5 μm inclusive, for example. At least part of the coil 22 is disposed on the nonmagnetic layer 21. The coil 22 has a thickness that is equal to or smaller than the thickness of the second layer 20C and that falls within a range of 2.5 to 3.0 μm inclusive, for example. The at least part of the coil 22 is disposed in a region of the nonmagnetic layer 21 that is opposite to the pole layer 16 and farther from the pole layer 16 than a surface (the top surface) of the first layer 20A opposite to the pole layer 16.

Reference is now made to FIG. 4A to FIG. 12A and FIG. 4B to FIG. 12B to describe a method of manufacturing the magnetic head of the embodiment. FIG. 4A to FIG. 12A are cross sections of layered structures obtained through the manufacturing process of the magnetic head, the cross sections being orthogonal to the medium facing surface and the substrate. FIG. 4B to FIG. 12B are cross sections of portions of the layered structures near the medium facing surface that are parallel to the medium facing surface. Portions closer to the substrate 1 than the pole-layer-encasing layer 12 are omitted in FIG. 4A to FIG. 12A and FIG. 4B to FIG. 12B.

According to the method of manufacturing the magnetic head of the embodiment, as shown in FIG. 2, the insulating layer 2, the bottom shield layer 3 and the bottom shield gap film 4 are first formed on the substrate 1 one by one. Next, the MR element 5 and a lead not shown that is connected to the MR element 5 are formed on the bottom shield gap film 4. Next, the MR element 5 and the lead are covered with the top shield gap film 6. Next, the top shield layer 7 and the insulating layer 8 are formed one by one on the top shield gap film 6. Next, the coil 9 and the insulating layers 10 and 11 are formed on the insulating layer 8. Next, the top surfaces of the coil 9 and the insulating layers 10 and 11 are flattened by CMP, for example. Next, the pole-layer-encasing layer 12 is formed on the flattened top surfaces of the coil 9 and the insulating layers 10 and 11.

FIG. 4A and FIG. 4B illustrate the following step. In the step, a photoresist layer having a thickness of 1.0 μm, for example, is formed on the pole-layer-encasing layer 12. The photoresist layer is then patterned to form a mask 31 for making the groove 12a in the encasing layer 12. The mask 31 has an opening having a shape corresponding to the groove 12a.

Next, as shown in FIG. 5A and FIG. 5B, the pole-layer-encasing layer 12 is selectively etched, using the mask 31, to form the groove 12a, such that the walls of the groove 12a corresponding to both sides of the track width defining portion 16A of the pole layer 16 form an angle that falls within a range of 5 to 12 degrees inclusive, for example, with respect to the direction orthogonal to the top surface of the substrate 1. The etching of the encasing layer 12 is performed by reactive ion etching or ion beam etching, for example. If reactive ion etching is employed, it is preferred to use an etching gas including at least one of $Cl_2$ and $BCl_3$. If ion beam etching is employed, the direction in which ion beams move forms an angle that falls within a range of 0 to 40 degrees inclusive, for example, with respect to the direction orthogonal to the top surface of the substrate 1.

Next, as shown in FIG. 6A and FIG. 6B, the nonmagnetic conductive film 13 is formed in the groove 12a of the pole-layer-encasing layer 12 and on the top surface of the encasing layer 12. The nonmagnetic conductive film 13 is formed by any of chemical vapor deposition (hereinafter referred to as CVD), sputtering, and ion beam deposition (hereinafter referred to as IBD), for example. The nonmagnetic conductive film 13 is formed to have a thin portion touching the side walls of the groove 12a, and thick portions touching the bottom of the groove 12a and the top surface of the encasing layer 12.

Figures 7A, 7B:
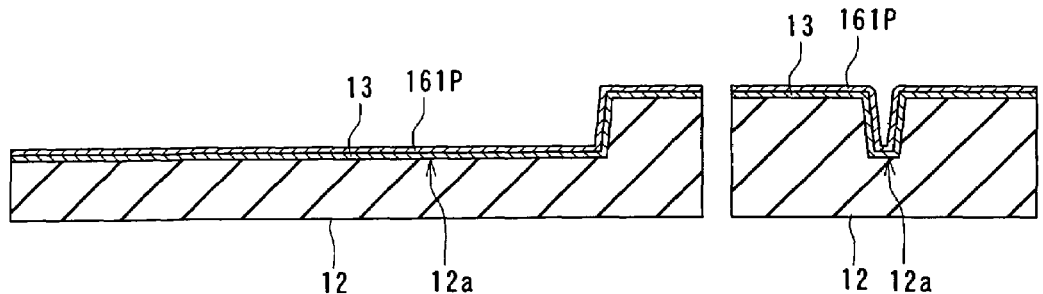
FIG. 7A and FIG. 7B are views for illustrating a step that follows the step shown in FIG. 6A and FIG. 6B.

Next, as shown in FIG. 7A and FIG. 7B, a first magnetic layer 161P to be the first layer 161 of the pole layer 16 is formed on the nonmagnetic conductive film 13. The first magnetic layer 161P is formed by sputtering or IBD, for example. If the first magnetic layer 161P is formed by sputtering, it is preferred to employ collimation sputtering or long throw sputtering.

Figures 8A, 8B:
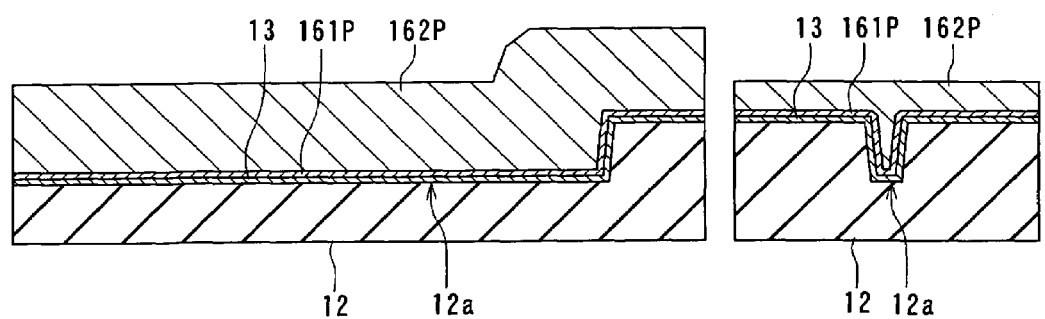
FIG. 8A and FIG. 8B are views for illustrating a step that follows the step shown in FIG. 7A and FIG. 7B.

Next, as shown in FIG. 8A and FIG. 8B, a second magnetic layer 162P to be the second layer 162 of the pole layer 16 is formed on the magnetic layer 161P. The second magnetic layer 162P is formed by plating, for example. In this case, the nonmagnetic conductive film 13 and the first magnetic layer 161P may be used as electrodes for plating.

Figures 9A, 9B:
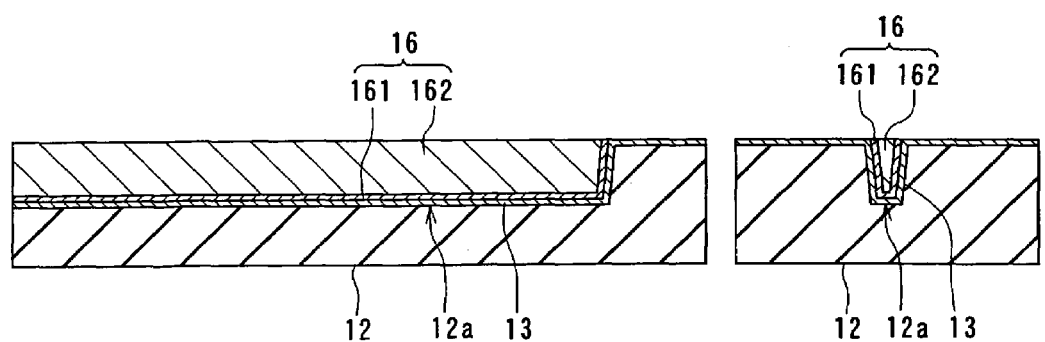
FIG. 9A and FIG. 9B are views for illustrating a step that follows the step shown in FIG. 8A and FIG. 8B.

Next, as shown in FIG. 9A and FIG. 9B, the second magnetic layer 162P and the first magnetic layer 161P are polished by CMP, for example, so that the nonmagnetic conductive film 13 is exposed, and the top surfaces of the nonmagnetic conductive film 13, the first magnetic layer 161P and the second magnetic layer 162P are thereby flattened. As a result, portions of the first magnetic layer 161P and the second magnetic layer 162P that are disposed on the top surface of the pole-layer-encasing layer 12 are removed, and the remaining portions of the first magnetic layer 161P and the second magnetic layer 162P in the groove 12a become the first layer 161 and the second layer 162, respectively. It is preferred that an alumina layer having a thickness of about 1 to 2 μm is formed on the entire top surface of the layered structure before polishing the second magnetic layer 162P and the first magnetic layer 161P. It is thereby possible to flatten the top surfaces of the nonmagnetic conductive film 13, the first magnetic layer 161P and the second magnetic layer 162P with higher accuracy. In addition, the polishing of the second magnetic layer 162P and the first magnetic layer 161P is stopped when the nonmagnetic conductive film 13 is exposed. Therefore, the nonmagnetic conductive film 13 functions as a layer for determining the level at which the polishing of the second magnetic layer 162P and the first magnetic layer 161P is stopped. It is thereby possible to control the thickness of the pole layer 16 made up of the first layer 161 and the second layer 162 with accuracy.

FIG. 10A and FIG. 10B illustrate the following step. In the step, first, the gap layer 18 is formed on the entire top surface of the layered structure. Next, a portion of the gap layer 18 away from the medium facing surface 30 is selectively etched to form an opening in the gap layer 18. Next, the first layer 20A is formed on the gap layer 18, and the coupling layer 20B is formed on a portion of the pole layer 16 where the opening of the gap layer 18 is formed. The first layer 20A and the coupling layer 20B may be formed by frame plating or by making a magnetic layer through sputtering and then selectively etching the magnetic layer. Selective etching of the magnetic layer may be performed by, for example, making an alumina layer on the magnetic layer, making a mask on the alumina layer by frame plating, and etching the alumina layer and the magnetic layer using the mask. Next, the nonmagnetic layer 21 is formed on the entire top surface of the layered structure.

FIG. 11A and FIG. 11B illustrate the following step. In the step, first, the nonmagnetic layer 21 is polished by CMP, for example, so that the first layer 20A and the coupling layer 20B are exposed, and the top surfaces of the first layer 20A, the coupling layer 20B and the nonmagnetic layer 21 are flattened. Next, the coil 22 is formed by frame plating, for example, such that at least part of the coil 22 is disposed on the nonmagnetic layer 21. Next, the second layer 20C and the coupling layer 20D are formed by frame plating, for example. Alternatively, the coil 22 may be formed after the second layer 20C and the coupling layer 20D are formed.

Figures 12A, 12B:
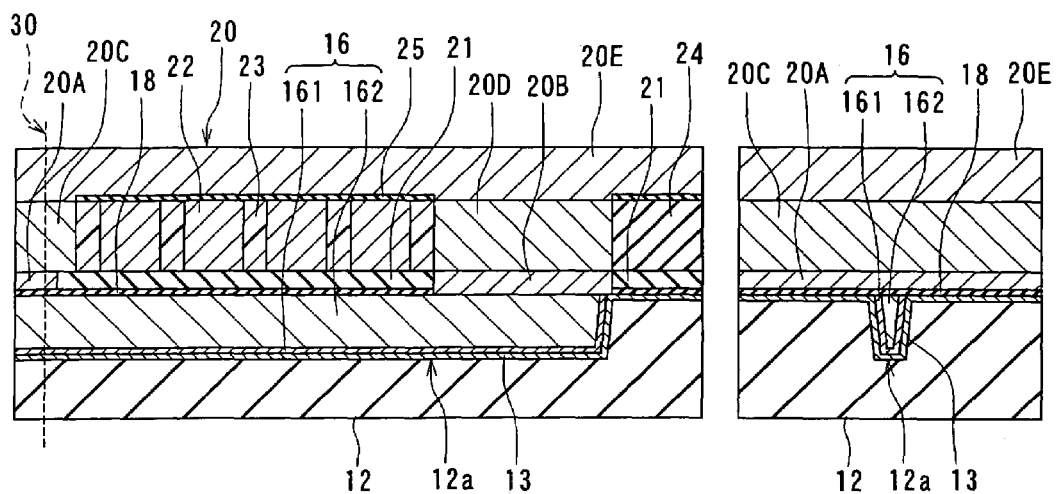
FIG. 12A and FIG. 12B are views for illustrating a step that follows the step shown in FIG. 1A and FIG. 11B.

FIG. 12A and FIG. 12B illustrate the following step. In the step, first, the insulating layer 23 made of photoresist, for example, is selectively formed in the space between adjacent ones of the turns of the coil 22 and around the coil 22. Next, the insulating layer 24 having a thickness of 4 to 4.5 μm, for example, is formed on the entire top surface of the layered structure. Next, the insulating layer 24 is polished by CMP, for example, so that the second layer 20C, the coupling layer 20D and the coil 22 are exposed, and the top surfaces of the second layer 20C, the coupling layer 20D, the coil 22 and the insulating layers 23 and 24 are thereby flattened. Alternatively, the coil 22 may be formed after the second layer 20C and the coupling layer 20D are formed. Next, the insulating layer 25 is formed on the coil 22 and the insulating layers 23 and 24. Next, the third layer 20E is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

The operation and effects of the magnetic head of the embodiment will now be described. The magnetic head writes data on a recording medium by using the write head and reads data written on the recording medium by using the read head. In the write head the coil 22 generates a magnetic field that corresponds to the data to be written on the medium. The pole layer 16 and the shield layer 20 form a magnetic path through which a magnetic flux corresponding to the magnetic field generated by the coil 22 passes. The pole layer 16 allows the flux corresponding to the field generated by the coil 22 to pass and generates a write magnetic field used for writing the data on the medium through the use of the perpendicular magnetic recording system. The shield layer 20 takes in a disturbance magnetic filed applied from outside the magnetic head to the magnetic head. It is thereby possible to prevent erroneous writing on the recording medium caused by the disturbance magnetic filed intensively taken in the pole layer 16.

According to the embodiment, in the medium facing surface 30, the end of the shield layer 20 is disposed forward of the end of the pole layer 16 along the direction T of travel of the recording medium (that is, on the air-outflow-end side of the slider) with a specific small space created by the gap layer 18. The location of an end of the bit pattern written on the recording medium is determined by the location of the end of the pole layer 16 that is closer to the gap layer 18 and located in the medium facing surface 30. The shield layer 20 takes in a magnetic flux generated from the end of the pole layer 16 located in the medium facing surface 30 and extending in directions except the direction orthogonal to the surface of the recording medium so as to prevent the flux from reaching the recording medium. It is thereby possible to prevent a direction of magnetization of the bit pattern already written on the medium from being changed due to the effect of the above-mentioned flux. According to the embodiment, an improvement in linear recording density is thus achieved.

According to the embodiment, as shown in FIG. 1, the end of the pole layer 16 located in the medium facing surface 30 has a width that decreases as the distance from the first side A1 decreases. It is thereby possible to prevent the problems resulting from the skew.

According to the embodiment, the pole layer 16 is disposed in the groove 12a of the pole-layer-encasing layer 12 made of a nonmagnetic insulating material, with the nonmagnetic conductive film 13 provided between the encasing layer 12 and the pole layer 16. Consequently, the pole layer 16 has a width smaller than the width of the groove 12a. It is thereby possible to easily form the groove 12a and to easily reduce the width of the pole layer 16 and in particular, the width of the top surface of the track width defining portion 16A for defining the track width. For example, if a portion of the opening of the groove 12a corresponding to the track width defining portion 16A has a width of 0.2 μm and the nonmagnetic conductive film 13 has a thickness of 50 nm (0.05 μm), then the width of the top surface of the track width defining portion 16A, that is, the track width, is 0.1 μm. According to the embodiment, it is possible to easily implement and precisely control the track width smaller than the minimum track width that can be formed by photolithography.

According to the embodiment, the pole layer 16 incorporates: the first layer 161 located closer to the surface of the groove 12a; and the second layer 162 located farther from the surface of the groove 12a. The first magnetic layer 161P to be the first layer 161 may be formed by sputtering or IBD, for example, so as to cover the surface of the groove 12a. The second magnetic layer 162P to be the second layer 162 may be formed by plating, for example. In this case, the nonmagnetic conductive film 13 and the first magnetic layer 161P function as electrodes for plating. Therefore, it is possible to feed a sufficient current to the nonmagnetic conductive film 13 and the first magnetic layer 161P as the electrodes even if the first magnetic layer 161P is thin. It is thereby possible to form the uniform second magnetic layer 162P in the groove 12a. As a result, according to the embodiment, it is possible to form the uniform pole layer 16 with accuracy even if the groove 12a has a small width.

According to the embodiment, after the nonmagnetic conductive film 13 is formed, the magnetic layers 161P and 162P to be the pole layer 16 are formed in the groove 12a and on the top surface of the pole-layer-encasing layer 12, and then the magnetic layers 161P and 162P are polished until the nonmagnetic conductive film 13 is exposed, so that the magnetic layers 161P and 162P make the pole layer 16. According to the embodiment, polishing of the magnetic layers 161P and 162P is stopped when the nonmagnetic conductive film 13 is exposed. It is thereby possible to control the thickness of the pole layer 16 with accuracy.

According to the embodiment, the side portions of the pole layer 16 are not etched. As a result, it is impossible that the neck height NH is made greater than a desired value and/or the pole layer 16 goes out of a desired shape. It is thereby possible to improve the overwrite property.

Because of the foregoing features of the embodiment, it is possible to form the pole layer 16 with accuracy that has a small width and a shape capable of preventing the problems resulting from the skew.

According to the embodiment, the first layer 161 of the pole layer 16 may be omitted. In this case, a magnetic layer to be the pole layer 16 is formed by plating, for example, on the nonmagnetic conductive film 13.

According to the embodiment, the flat-whorl shaped coils 9 and 22 may be replaced with coils wound in a helical manner around the pole layer 16.

Figures 13A, 13B:
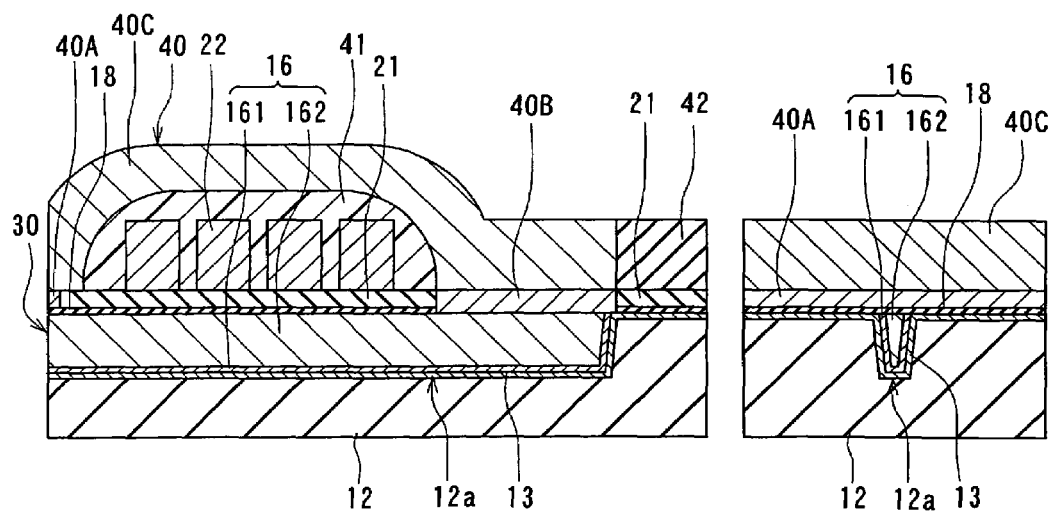
FIG. 13A and FIG. 13B are cross-sectional views for illustrating a modification example of the magnetic head of the first embodiment of the invention.

FIG. 13A and FIG. 13B illustrate a modification example of the magnetic head of the embodiment. FIG. 13A illustrates a cross section of the main part of the magnetic head orthogonal to the medium facing surface and the substrate. FIG. 13B illustrates a cross section of the main part of the magnetic head near the medium facing surface, the cross section being parallel to the medium facing surface. In FIG. 13A and FIG. 13B the portion closer to the substrate 1 than the pole-layer-encasing layer 12 is omitted.

This modification example comprises an insulating layer 41 covering at least part of the coil 22 in place of the insulating layers 23 and 25 of FIG. 2. The modification example comprises a shield layer 40 in place of the shield layer 20 of FIG. 2, and an insulating layer 42 in place of the insulating layer 24 of FIG. 2. The shield layer 40 incorporates a first layer 40A, a coupling layer 40B and a second layer 40C. As the first layer 20A of FIG. 2, the first layer 40A has a first end located in the medium facing surface 30 and a second end located on the opposite side of the first end. The nonmagnetic layer 21 is disposed on a side of the first layer 40A. As the coupling layer 20B of FIG. 2, the coupling layer 40B is disposed on a portion of the pole layer 16 where the opening of the gap layer 18 is formed. The second layer 40C has an end located in the medium facing surface 30, and is disposed to couple the first layer 40A to the coupling layer 40B. The second layer 40C includes a portion located on a side of at least part of the coil 22 covered with the insulating layer 41, the side being opposite to the pole layer 16. The insulating layer 42 is disposed around the second layer 40C. The second layer 40C includes a portion located between the medium facing surface 30 and the coil 22. In this portion the distance between an end located in the medium facing surface 30 and the other end increases as the distance from the first layer 40A increases. The first layer 40A, the coupling layer 40B and the second layer 40C are made of any of NiFe, CoNiFe and CoFe, for example. The insulating layer 41 is made of photoresist, for example. The insulating layer 42 is made of alumina, for example. According to a method of manufacturing the magnetic head of the modification example, after the coil 22 is formed, the insulating layer 41, the second layer 40C, and the insulating layer 42 are formed one by one.

Second Embodiment

A magnetic head and a method of manufacturing the same of a second embodiment of the invention will now be described. Reference is now made to FIG. 14A to FIG. 17A and FIG. 14B to FIG. 17B to describe the method of manufacturing the magnetic head of the second embodiment. FIG. 14A to FIG. 17A are cross sections of layered structures obtained through the manufacturing process of the magnetic head, the cross sections being orthogonal to the medium facing surface and the substrate. FIG. 14B to FIG. 17B are cross sections of portions of the layered structures near the medium facing surface that are parallel to the medium facing surface. Portions closer to the substrate 1 than the pole-layer-encasing layer 12 are omitted in FIG. 14A to FIG. 17A and FIG. 14B to FIG. 17B.

The method of manufacturing the magnetic head of the second embodiment includes the steps up to the step of forming the groove 12a of the pole-layer-encasing layer 12 that are the same as those of the first embodiment. In the following step of the second embodiment, as shown in FIG. 14A and FIG. 14B, a nonmagnetic film 51 made of a nonmagnetic insulating material or a nonmagnetic semiconductor material is formed in the groove 12a of the pole-layer-encasing layer 12 and on the top surface of the encasing layer 12. The nonmagnetic film 51 has a thickness that falls within a range of 20 to 50 nm inclusive, for example. The nonmagnetic film 51 may be made of a nonmagnetic insulating material such as alumina, silicon oxide ($SiO_x$), or silicon oxynitride (SiON). The nonmagnetic film 51 may be made of a nonmagnetic semiconductor material such as polycrystalline silicon or amorphous silicon. The nonmagnetic film 51 may be formed by sputtering or CVD. If the nonmagnetic film 51 is formed by CVD, it is preferred to employ a method called 'atomic layer CVD' (ALCVD) in which formation of a single atomic layer is repeated. If the nonmagnetic film 51 is made of a nonmagnetic semiconductor material, it is preferred to form the nonmagnetic film 51 by ALCVD at a low temperature (around 200° C.) or low-pressure CVD at a low temperature. The nonmagnetic semiconductor material as the material of the nonmagnetic film 51 is preferably undoped polycrystalline silicon or amorphous silicon.

FIG. 15A and FIG. 15B illustrate the following step. In the step, first, a nonmagnetic conductive film 52 is formed on the nonmagnetic film 51. The thickness, the material and the forming method of the nonmagnetic conductive film 52 are the same as those of the nonmagnetic conductive film 13 of the first embodiment. Next, the first magnetic layer 161P and the second magnetic layer 162P are formed one by one on the nonmagnetic film 51 in a manner the same as that of the first embodiment.

Next, as shown in FIG. 16A and FIG. 16B, the second magnetic layer 162P and the first magnetic layer 161P are polished by CMP, for example, so that the nonmagnetic conductive film 52 is exposed, and the top surfaces of the nonmagnetic conductive film 52, the first magnetic layer 161P and the second magnetic layer 162P are thereby flattened. As a result, portions of the first magnetic layer 161P and the second magnetic layer 162P that are disposed on the top surface of the pole-layer-encasing layer 12 are removed, and the remaining portions of the first magnetic layer 161P and the second magnetic layer 162P in the groove 12a become the first layer 161 and the second layer 162, respectively. It is preferred that an alumina layer having a thickness of about 1 to 2 μm is formed on the entire top surface of the layered structure before polishing the second magnetic layer 162P and the first magnetic layer 161P. It is thereby possible to flatten the top surfaces of the nonmagnetic conductive film 52, the first magnetic layer 161P and the second magnetic layer 162P with higher accuracy. In addition, the polishing of the second magnetic layer 162P and the first magnetic layer 161P is stopped when the nonmagnetic conductive film 52 is exposed. It is thereby possible to control the thickness of the pole layer 16 made up of the first layer 161 and the second layer 162 with accuracy.

Figures 17A, 17B:
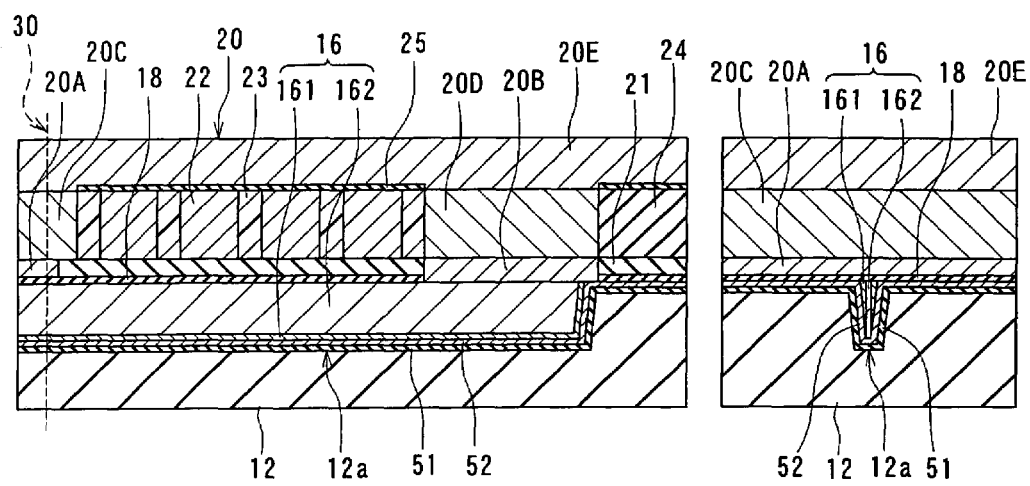
FIG. 17A and FIG. 17B are views for illustrating a step that follows the step shown in FIG. 16A and FIG. 16B.

The following steps are the same as those of the first embodiment. FIG. 17A and FIG. 17B illustrate the state in which the shield layer 20 is completed. The magnetic head of the second embodiment has a configuration similar to that of the first embodiment except the portions formed through the steps illustrated in FIG. 14A to FIG. 16A and FIG. 14B to FIG. 16B.

According to the second embodiment, the pole layer 16 is disposed in the groove 12a of the pole-layer-encasing layer 12 made of a nonmagnetic insulating material, with the nonmagnetic film 51 and the nonmagnetic conductive film 52 provided between the encasing layer 12 and the pole layer 16. Consequently, the pole layer 16 has a width smaller than the width of the groove 12a. It is thereby possible to easily form the groove 12a and to easily reduce the width of the pole layer 16 and particularly the width of the top surface of the track width defining portion 16A for defining the track width. For example, if a portion of the opening of the groove 12a corresponding to the track width defining portion 16A has a width of 0.16 μm and each of the nonmagnetic film 51 and the nonmagnetic conductive film 52 has a thickness of 20 nm (0.02 μm), then the width of the top surface of the track width defining portion 16A, that is, the track width, is 0.08 μm. According to the embodiment, it is possible to easily implement and precisely control the track width smaller than the minimum track width that can be formed by photolithography.

According to the second embodiment, if the nonmagnetic film 51 is formed by ALCVD, it is possible to form the nonmagnetic film 51 that allows easy control of thickness and is uniform in quality and thickness. As a result, it is possible to form the pole layer 16 with higher accuracy that has a small width and a shape capable of preventing the problems resulting from the skew.

In the second embodiment, the nonmagnetic conductive film 52 or the first layer 161 of the pole layer 16 may be omitted. If the nonmagnetic conductive film 52 is omitted, the first magnetic layer 161P serves as an electrode for forming the second magnetic layer 162P by plating. If the first layer 161 is omitted, a magnetic layer to be the pole layer 16 is formed by plating, for example, on the nonmagnetic conductive film 52.

The remainder of the operation and effects of the second embodiment are similar to those of the first embodiment.

Third Embodiment

A magnetic head and a method of manufacturing the same of a third embodiment of the invention will now be described. Reference is now made to FIG. 18A to FIG. 25A and FIG. 18B to FIG. 25B to describe the method of manufacturing the magnetic head of the third embodiment. FIG. 18A to FIG. 25A are cross sections of layered structures obtained through the manufacturing process of the magnetic head, the cross sections being orthogonal to the medium facing surface and the substrate. FIG. 18B to FIG. 25B are cross sections of portions of the layered structures near the medium facing surface that are parallel to the medium facing surface. Portions closer to the substrate 1 than the pole-layer-encasing layer 12 are omitted in FIG. 18A to FIG. 25A and FIG. 18B to FIG. 25B.

Figures 18A, 18B:
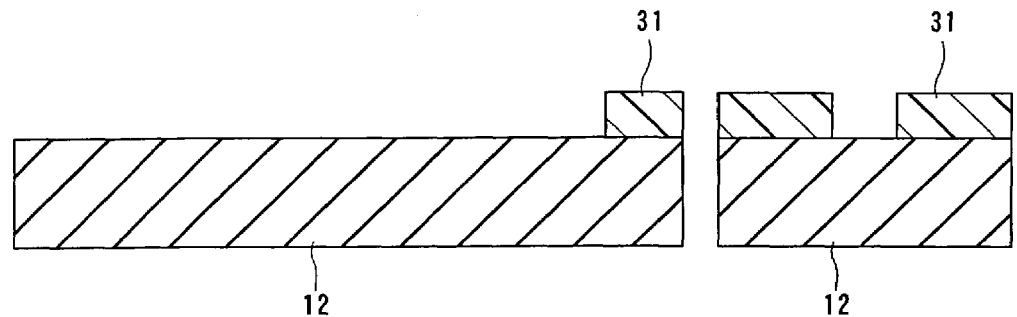
FIG. 18A and FIG. 18B are views for illustrating a step of a method of manufacturing a magnetic head of a third embodiment of the invention.
Figures 19A, 19B:
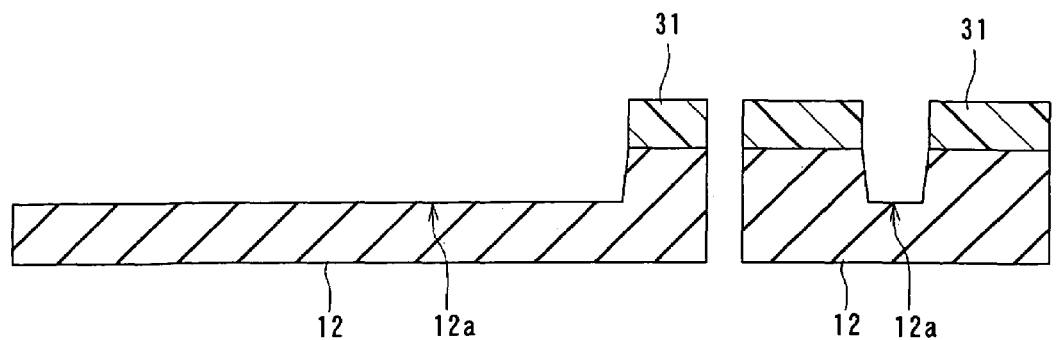
FIG. 19A and FIG. 19B are views for illustrating a step that follows the step shown in FIG. 18A and FIG. 18B.

The method of manufacturing the magnetic head of the third embodiment includes the steps up to the step of forming the groove 12a of the pole-layer-encasing layer 12 that are the same as those of the first embodiment. FIG. 18A and FIG. 18B illustrate the step of forming the mask 31 on the pole-layer-encasing layer 12. FIG. 19A and FIG. 19B illustrate the step of forming the groove 12a by selectively etching the pole-layer-encasing layer 12, using the mask 31.

Figures 20A, 20B:
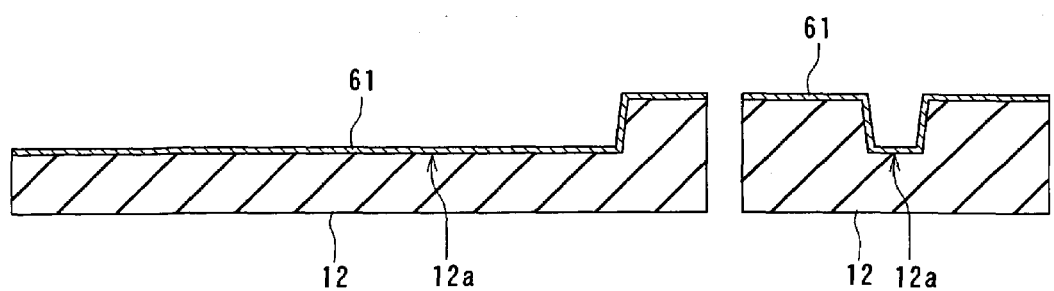
FIG. 20A and FIG. 20B are views for illustrating a step that follows the step shown in FIG. 19A and FIG. 19B.

In the following step of the third embodiment, as shown in FIG. 20A and FIG. 20B, a first nonmagnetic conductive film 61 made of a nonmagnetic conductive material is formed in the groove 12a of the pole-layer-encasing layer 12 and on the top surface of the encasing layer 12. The nonmagnetic conductive film 61 has a thickness that falls within a range of 20 to 30 nm inclusive, for example. The material and the forming method of the nonmagnetic conductive film 61 are the same as those of the nonmagnetic conductive film 13 of the first embodiment.

Figures 21A, 21B:
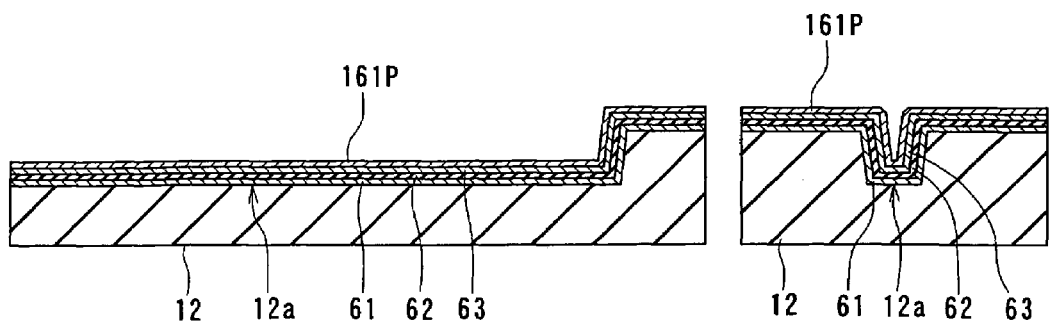
FIG. 21A and FIG. 21B are views for illustrating a step that follows the step shown in FIG. 20A and FIG. 20B.

FIG. 21A and FIG. 21B illustrate the following step. In the step, first, a nonmagnetic film 62 made of a nonmagnetic insulating material or a nonmagnetic semiconductor material is formed on the nonmagnetic conductive film 61. The nonmagnetic film 62 has a thickness that falls within a range of 20 to 40 nm inclusive, for example. The material and the forming method of the nonmagnetic film 62 are the same as those of the nonmagnetic film 51 of the second embodiment. Next, a second nonmagnetic conductive film 63 is formed on the nonmagnetic film 62. The nonmagnetic conductive film 63 has a thickness that falls within a range of 20 to 30 nm inclusive, for example. The material and the forming method of the nonmagnetic conductive film 63 are the same as those of the nonmagnetic conductive film 13 of the first embodiment. Next, the first magnetic layer 161P is formed on the nonmagnetic conductive film 63 in a manner the same as that of the first embodiment.

Figure 22A:
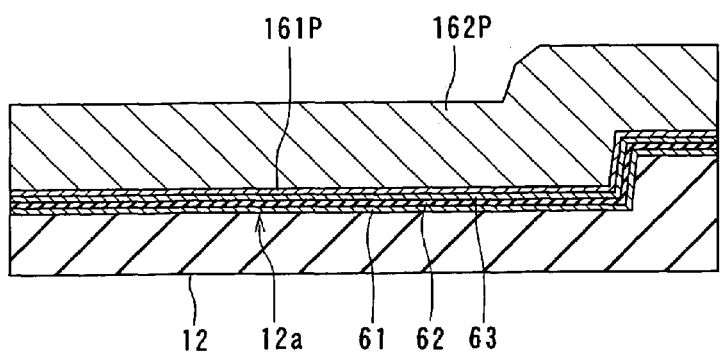
FIG. 22A and FIG. 22B are views for illustrating a step that follows the step shown in FIG. 21A and FIG. 21B.
Figure 22B:
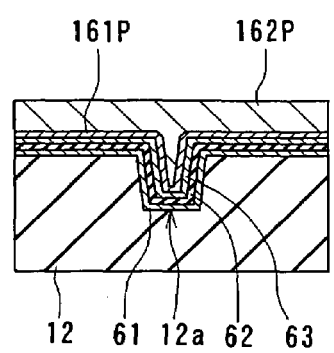

Next, as shown in FIG. 22A and FIG. 22B, the second magnetic layer 162P is formed on the first magnetic layer 161P in a manner the same as that of the first embodiment.

Figure 23A:
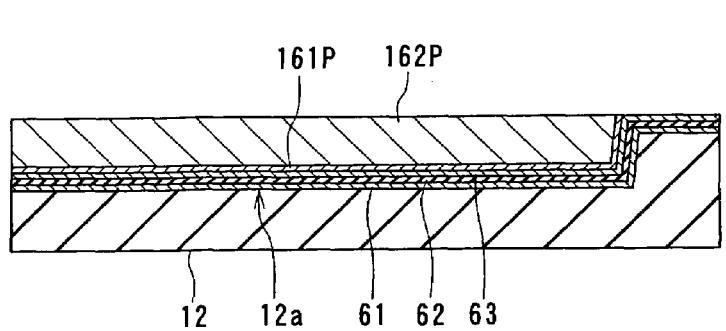
FIG. 23A and FIG. 23B are views for illustrating a step that follows the step shown in FIG. 22A and FIG. 22B.
Figure 23B:
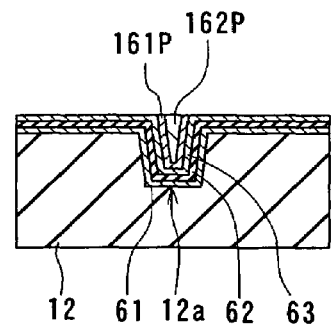

Next, as shown in FIG. 23A and FIG. 23B, the second magnetic layer 162P and the first magnetic layer 161P are polished by CMP, for example, so that the second nonmagnetic conductive film 63 is exposed, and the top surfaces of the nonmagnetic conductive film 63, the first magnetic layer 161P and the second magnetic layer 162P are thereby flattened. This step is called a first polishing step. Through this first polishing step, portions of the first magnetic layer 161P and the second magnetic layer 162P that are located on the top surface of the pole-layer-encasing layer 12 are removed. It is preferred that an alumina layer having a thickness of about 1 to 2 µm is formed on the entire top surface of the layered structure before polishing the second magnetic layer 162P and the first magnetic layer 161P. It is thereby possible to flatten the top surfaces of the nonmagnetic conductive film 63, the first magnetic layer 161P and the second magnetic layer 162P with higher accuracy. In addition, the polishing of the second magnetic layer 162P and the first magnetic layer 161P is stopped when the nonmagnetic conductive film 63 is exposed.

FIG. 24A and FIG. 24B illustrate the following step. In the step, first, a portion of the nonmagnetic conductive film 63 exposed from the top surface of the layered structure is selectively removed by any of reactive ion etching, ion beam etching, and wet etching, for example. Next, the second magnetic layer 162P, the first magnetic layer 161P and the nonmagnetic film 62 are polished by CMP, for example, so that the first nonmagnetic conductive film 61 is exposed, and the top surfaces of the first nonmagnetic conductive film 61, the nonmagnetic film 62, the second nonmagnetic conductive film 63, the first magnetic layer 161P, and the second magnetic layer 162P are thereby flattened. This step is called a second polishing step. Through this second polishing step, the portions of the first magnetic layer 161P and the second magnetic layer 162P remaining in the groove 12a become the first layer 161 and the second layer 162, respectively. The second polishing step is stopped when the nonmagnetic conductive film 61 is exposed. It is thereby possible to control the thickness of the pole layer 16 made up of the first layer 161 and the second layer 162 with accuracy.

The following steps are the same as those of the first embodiment. FIG. 25A and FIG. 25B illustrate the state in which the shield layer 20 is completed. The magnetic head of the third embodiment has a configuration similar to that of the first embodiment except the portions formed through the steps illustrated in FIG. 18A to FIG. 24A and FIG. 18B to FIG. 24B.

According to the third embodiment, the pole layer 16 is disposed in the groove 12a of the pole-layer-encasing layer 12 made of a nonmagnetic insulating material, with the first nonmagnetic conductive film 61, the nonmagnetic film 62 and the second nonmagnetic conductive film 63 provided between the encasing layer 12 and the pole layer 16. Consequently, the pole layer 16 has a width smaller than the width of the groove 12a. It is thereby possible to easily form the groove 12a and to easily reduce the width of the pole layer 16 and particularly the width of the top surface of the track width defining portion 16A for defining the track width. For example, if a portion of the opening of the groove 12a corresponding to the track width defining portion 16A has a width of 0.3 µm, each of the nonmagnetic conductive films 61 and 63 has a thickness of 20 to 30 nm and the nonmagnetic film 62 has a thickness of 20 to 40 nm, then the width of the top surface of the track width defining portion 16A, that is, the track width, is 0.10 to 0.18 µm. According to the embodiment, it is possible to easily implement and precisely control the track width smaller than the minimum track width that can be formed by photolithography.

According to the third embodiment, if the nonmagnetic film 62 is formed by ALCVD, it is possible to form the nonmagnetic film 62 that allows easy control of thickness and is uniform in quality and thickness. As a result, it is possible to form the pole layer 16 with higher accuracy that has a small width and a shape capable of preventing the problems resulting from the skew.

In the third embodiment, the step of polishing the magnetic layers 161P and 162P includes the first polishing step of polishing the magnetic layers 161P and 162P so that the second nonmagnetic conductive film 63 is exposed, and the second polishing step of polishing the magnetic layers 161P and 162P so that the first nonmagnetic conductive film 61 formed on the top surface of the pole-layer-encasing layer 12 is exposed. Through the first polishing step, it is possible to flatten the top surfaces of the first magnetic layer 161P and the second magnetic layer 162P at the level of the top surface of the nonmagnetic conductive film 63, even if the pole layer 162P has a great variation in thickness. Through the second polishing step, the magnetic layers 161P and 162P are polished to a depth substantially equal to the thickness of the nonmagnetic film 62. Since the nonmagnetic film 62 has an excellent uniformity in thickness, it is possible to flatten the top surfaces of the first magnetic layer 161P and the second magnetic layer 162P at the level of the top surface of the nonmagnetic conductive film 61 with accuracy. As a result, according to the embodiment, it is possible to control the thickness of the pole layer 16 made up of the first layer 161 and the second layer 162 with a high degree of accuracy.

In the third embodiment, the second nonmagnetic conductive film 63 or the first layer 161 of the pole layer 16 may be omitted. If the nonmagnetic conductive film 63 is omitted, the first magnetic layer 161P serves as an electrode for forming the second magnetic layer 162P by plating. If the first layer 161 is omitted, a magnetic layer to be the pole layer 16 is formed by plating, for example, on the nonmagnetic conductive film 63.

The remainder of the operation and effects of the third embodiment are similar to those of the first or second embodiment.

Fourth Embodiment

A magnetic head and a method of manufacturing the same of a fourth embodiment of the invention will now be described. Reference is now made to FIG. 26A to FIG. 30A and FIG. 26B to FIG. 30B to describe the method of manufacturing the magnetic head of the fourth embodiment. FIG. 26A to FIG. 30A are cross sections of layered structures obtained through the manufacturing process of the magnetic head, the cross sections being orthogonal to the medium facing surface and the substrate. FIG. 26B to FIG. 30B are cross sections of portions of the layered structures near the medium facing surface that are parallel to the medium facing surface. The coil 9 and the insulating layers 10 and 11 and portions closer to the substrate 1 than the coil 9 and the insulating layers 10 and 11 are omitted in FIG. 26A to FIG. 30A and FIG. 26B to FIG. 30B.

The method of manufacturing the magnetic head of the fourth embodiment includes the steps up to the step of flattening the top surfaces of the coil 9 and the insulating layers 10 and 11 that are the same as those of the first embodiment.

FIG. 26A and FIG. 26B illustrate the following step. In the step, first, an insulating layer 71 made of alumina, for example, is formed on the flattened top surfaces of the coil 9 and the insulating layers 10 and 11. Next, a pole-layer-encasing layer 72 made of a nonmagnetic conductive material is formed on the insulating layer 71. The encasing layer 72 has a thickness that falls within a range of 0.2 to 0.4 μm inclusive, for example. The encasing layer 72 may be made of any of Ta, Mo, W, Ti, Ru, Rh, Re, Pt, Pd, Ir, TiN, TiW, and NiCr, for example. Next, a groove 72a in which the pole layer 16 is placed is formed in the encasing layer 72. The method of forming the groove 72a is the same as the method of forming the groove 12a of the first embodiment. Although the groove 72a does not penetrate the encasing layer 72 in FIG. 26A and FIG. 26B, the groove 72a may penetrate the encasing layer 72.

FIG. 27A and FIG. 27B illustrate the following step. In the step, first, the nonmagnetic conductive film 13 is formed in the groove 72a of the pole-layer-encasing layer 72 and on the top surface of the encasing layer 72. The thickness, the material and the forming method of the nonmagnetic conductive film 13 are the same as those of the first embodiment. Next, the first magnetic layer 161P and the second magnetic layer 162P are formed one by one on the nonmagnetic conductive film 13 in a manner the same as that of the first embodiment. In the fourth embodiment, however, the second magnetic layer 162P is patterned to have a specific geometry so as to serve as a mask for patterning the pole-layer-encasing layer 72 later. The second magnetic layer 162P has a plane geometry that is slightly greater than that of the pole layer 16, for example.

FIG. 28A and FIG. 28B illustrate the following step. In the step, first, the first magnetic layer 161P, the nonmagnetic conductive film 13 and the pole-layer-encasing layer 72 are selectively etched by reactive ion etching or ion beam etching, for example, using the second magnetic layer 162P as a mask. Next, an insulating layer 73 made of alumina, for example, and having a thickness of 0.5 to 0.8 μm, for example, is formed on the entire top surface of the layered structure.

Next, as shown in FIG. 29A and FIG. 29B, the insulating layer 73, the second magnetic layer 162P and the first magnetic layer 161P are polished by CMP, for example, so that the nonmagnetic conductive film 13 is exposed, and the top surfaces of the nonmagnetic conductive film 13, the first magnetic layer 161P, the second magnetic layer 162P and the insulating layer 73 are thereby flattened. As a result, portions of the first magnetic layer 161P and the second magnetic layer 162P that are disposed on the top surface of the pole-layer-encasing layer 72 are removed, and the remaining portions of the first magnetic layer 161P and the second magnetic layer 162P in the groove 72a become the first layer 161 and the second layer 162, respectively. The above-mentioned polishing is stopped when the nonmagnetic conductive film 13 is exposed. It is thereby possible to control the thickness of the pole layer 16 made up of the first layer 161 and the second layer 162 with accuracy.

Figure 31:
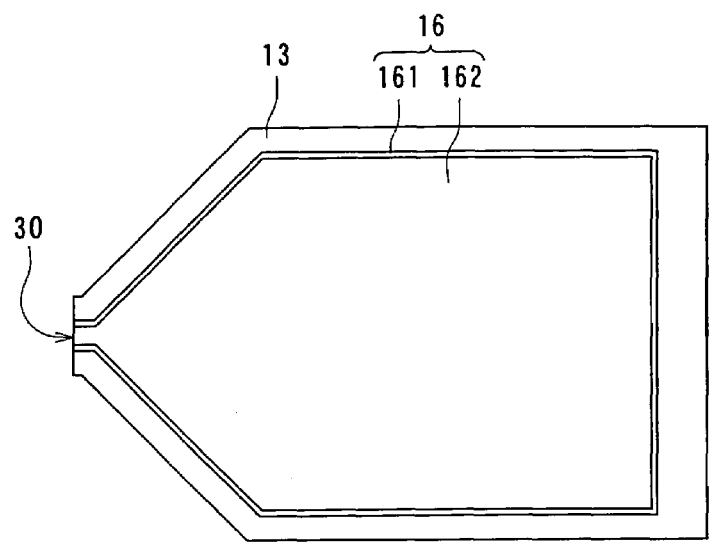
FIG. 31 is a top view of the nonmagnetic conductive film and the pole layer of the magnetic head of the fourth embodiment of the invention.

The following steps are the same as those of the first embodiment. FIG. 30A and FIG. 30B illustrate the state in which the shield layer 20 is completed. FIG. 31 is a top view of the nonmagnetic conductive film 13 and the pole layer 16. The magnetic head of the fourth embodiment has a configuration similar to that of the first embodiment except the portions formed through the steps illustrated in FIG. 26A to FIG. 29A and FIG. 26B to FIG. 29B.

According to the embodiment, the pole layer 16 is disposed in the groove 72a of the pole-layer-encasing layer 72 made of a nonmagnetic conductive material, with the nonmagnetic conductive film 13 provided between the encasing layer 72 and the pole layer 16. In the fourth embodiment, when the second magnetic layer 162P is formed by plating, the encasing layer 72, the nonmagnetic conductive film 13 and the first magnetic layer 161P function as electrodes for plating. Therefore, it is possible to feed a sufficient current to the encasing layer 72, the nonmagnetic conductive film 13 and the first magnetic layer 161P as the electrodes even if the first magnetic layer 161P is thin. It is thereby possible to form the uniform second magnetic layer 162P in the groove 72a. As a result, according to the embodiment, it is possible to form the uniform pole layer 16 with accuracy even if the groove 72a has a small width.

In the fourth embodiment, the first layer 161 of the pole layer 16 may be omitted. In this case, a magnetic layer to be the pole layer 16 is formed by plating, for example, on the nonmagnetic conductive film 13.

The remainder of the operation and effects of the fourth embodiment are similar to those of the first embodiment.

Fifth Embodiment

A magnetic head and a method of manufacturing the same of a fifth embodiment of the invention will now be described. Reference is now made to FIG. 32A to FIG. 35A and FIG. 32B to FIG. 35B to describe the method of manufacturing the magnetic head of the fifth embodiment. FIG. 32A to FIG. 35A are cross sections of layered structures obtained through the manufacturing process of the magnetic head, the cross sections being orthogonal to the medium facing surface and the substrate. FIG. 32B to FIG. 35B are cross sections of portions of the layered structures near the medium facing surface that are parallel to the medium facing surface. The coil 9 and the insulating layers 10 and 11 and portions closer to the substrate 1 than the coil 9 and the insulating layers 10 and 11 are omitted in FIG. 32A to FIG. 35A and FIG. 32B to FIG. 35B.

The method of manufacturing the magnetic head of the fifth embodiment includes the steps up to the step of forming the groove 72a of the pole-layer-encasing layer 72 that are the same as those of the fourth embodiment.

Figures 32A, 32B:
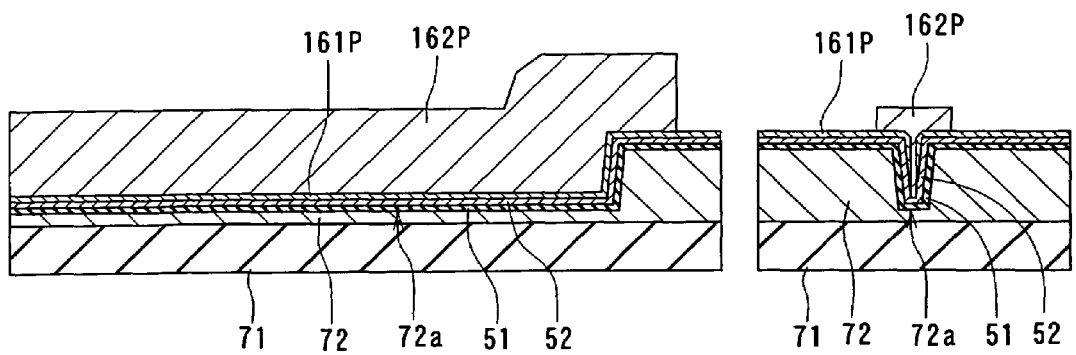
FIG. 32A and FIG. 32B are views for illustrating a step of a method of manufacturing a magnetic head of a fifth embodiment of the invention.

FIG. 32A and FIG. 32B illustrate the following step. In the step, first, the nonmagnetic film 51 is formed in the groove 72a of the pole-layer-encasing layer 72 and on the top surface of the encasing layer 72 in a manner the same as that of the second embodiment. Next, the nonmagnetic conductive film 52, the first magnetic layer 161P and the second magnetic layer 162P are formed one by one on the nonmagnetic film 51 in a manner the same as that of the second embodiment. As in the fourth embodiment, the second magnetic layer 162P is patterned to have a specific geometry so as to serve as a mask for patterning the pole-layer-encasing layer 72 later.

FIG. 33A and FIG. 33B illustrate the following step. In the step, first, the first magnetic layer 161P, the nonmagnetic conductive film 52, the nonmagnetic film 51, and the pole-layer-encasing layer 72 are selectively etched by reactive ion etching or ion beam etching, for example, using the second magnetic layer 162P as a mask. Next, the insulating layer 73 made of alumina, for example, and having a thickness of 0.5 to 0.8 μm, for example, is formed on the entire top surface of the layered structure.

Next, as shown in FIG. 34A and FIG. 34B, the insulating layer 73, the second magnetic layer 162P and the first magnetic layer 161P are polished by CMP, for example, so that the nonmagnetic conductive film 52 is exposed, and the top surfaces of the nonmagnetic conductive film 52, the first magnetic layer 161P, the second magnetic layer 162P and the insulating layer 73 are thereby flattened. As a result, portions of the first magnetic layer 161P and the second magnetic layer 162P that are disposed on the top surface of the pole-layer-encasing layer 72 are removed, and the remaining portions of the first magnetic layer 161P and the second magnetic layer 162P in the groove 72a become the first layer 161 and the second layer 162, respectively. The above-mentioned polishing is stopped when the nonmagnetic conductive film 52 is exposed. It is thereby possible to control the thickness of the pole layer 16 made up of the first layer 161 and the second layer 162 with accuracy.

Figures 35A, 35B:
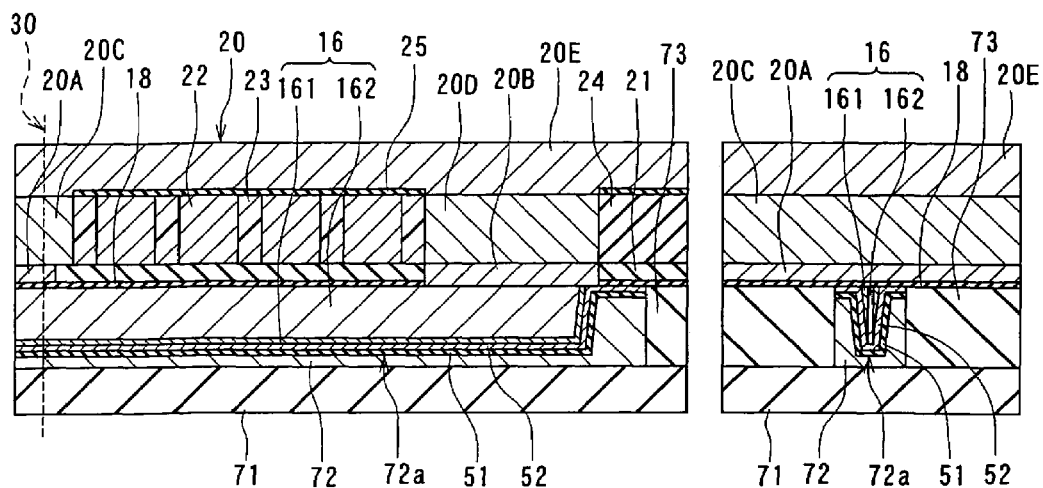
FIG. 35A and FIG. 35B are views for illustrating a step that follows the step shown in FIG. 34A and FIG. 34B.

The following steps are the same as those of the first embodiment. FIG. 35A and FIG. 35B illustrate the state in which the shield layer 20 is completed. The magnetic head of the fifth embodiment has a configuration similar to that of the first embodiment except the portions formed through the steps illustrated in FIG. 32A to FIG. 34A and FIG. 32B to FIG. 34B.

According to the fifth embodiment, the pole layer 16 is disposed in the groove 72a of the pole-layer-encasing layer 72 made of a nonmagnetic conductive material, with the nonmagnetic film 51 and the nonmagnetic conductive film 52 provided between the encasing layer 72 and the pole layer 16.

In the fifth embodiment, the nonmagnetic conductive film 52 or the first layer 161 of the pole layer 16 may be omitted. If the nonmagnetic conductive film 52 is omitted, the first magnetic layer 161P serves as an electrode for forming the second magnetic layer 162P by plating. If the first layer 161 is omitted, a magnetic layer to be the pole layer 16 is formed by plating, for example, on the nonmagnetic conductive film 52.

The remainder of the operation and effects of the fifth embodiment are similar to those of the second embodiment.

Sixth Embodiment

A magnetic head and a method of manufacturing the same of a sixth embodiment of the invention will now be described. Reference is now made to FIG. 36A to FIG. 40A and FIG. 36B to FIG. 40B to describe the method of manufacturing the magnetic head of the sixth embodiment. FIG. 36A to FIG. 40A are cross sections of layered structures obtained through the manufacturing process of the magnetic head, the cross sections being orthogonal to the medium facing surface and the substrate. FIG. 36B to FIG. 40B are cross sections of portions of the layered structures near the medium facing surface that are parallel to the medium facing surface. The coil 9 and the insulating layers 10 and 11 and portions closer to the substrate 1 than the coil 9 and the insulating layers 10 and 11 are omitted in FIG. 36A to FIG. 40A and FIG. 36B to FIG. 40B.

The method of manufacturing the magnetic head of the sixth embodiment includes the steps up to the step of forming the groove 72a of the pole-layer-encasing layer 72 that are the same as those of the fourth embodiment.

Figures 36A, 36B:
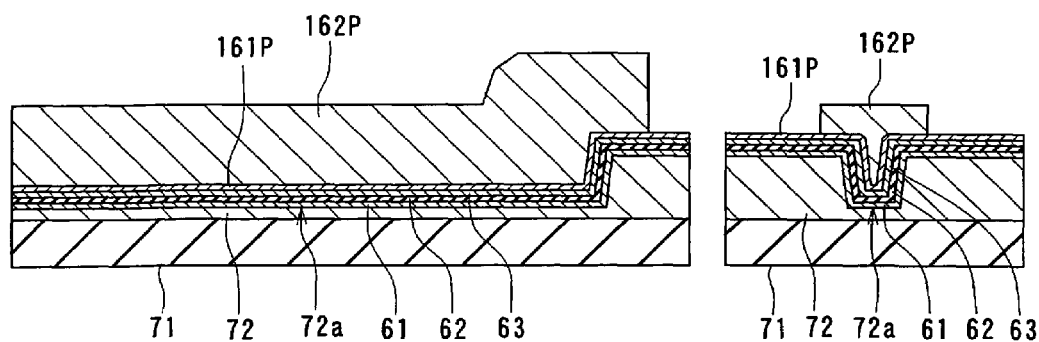
FIG. 36A and FIG. 36B are views for illustrating a step of a method of manufacturing a magnetic head of a sixth embodiment of the invention.

FIG. 36A and FIG. 36B illustrate the following step. In the step, first, the first nonmagnetic conductive film 61 is formed in the groove 72a of the pole-layer-encasing layer 72 and on the top surface of the encasing layer 72 in a manner the same as that of the third embodiment. Next, the nonmagnetic film 62, the second nonmagnetic conductive film 63, the first magnetic layer 161P and the second magnetic layer 162P are formed one by one on the nonmagnetic conductive film 61 in a manner the same as that of the third embodiment. As in the fourth embodiment, the second magnetic layer 162P is patterned to have a specific geometry so as to serve as a mask for patterning the pole-layer-encasing layer 72 later.

FIG. 37A and FIG. 37B illustrate the following step. In the step, first, the first magnetic layer 161P, the second nonmagnetic conductive film 63, the nonmagnetic film 62, the first nonmagnetic conductive film 61 and the pole-layer-encasing layer 72 are selectively etched by reactive ion etching or ion beam etching, for example, using the second magnetic layer 162P as a mask. Next, the insulating layer 73 made of alumina, for example, and having a thickness of 0.5 to 0.8 µm, for example, is formed on the entire top surface of the layered structure.

Next, as shown in FIG. 38A and FIG. 38B, the insulating layer 73, the second magnetic layer 162P and the first magnetic layer 161P are polished by CMP, for example, so that the second nonmagnetic conductive film 63 is exposed, and the top surfaces of the nonmagnetic conductive film 63, the first magnetic layer 161P, the second magnetic layer 162P and the insulating layer 73 are thereby flattened. This step is called a first polishing step. Through this first polishing step, portions of the first magnetic layer 161P and the second magnetic layer 162P that are located on the top surface of the pole-layer-encasing layer 72 are removed. The polishing of the second magnetic layer 162P and the first magnetic layer 161P is stopped when the nonmagnetic conductive film 63 is exposed.

FIG. 39A and FIG. 39B illustrate the following step. In the step, first, a portion of the nonmagnetic conductive film 63 exposed from the top surface of the layered structure is selectively removed by any of reactive ion etching, ion beam etching, and wet etching, for example. Next, the second magnetic layer 162P, the first magnetic layer 161P and the nonmagnetic film 62 are polished by CMP, for example, so that the first nonmagnetic conductive film 61 is exposed, and the top surfaces of the first nonmagnetic conductive film 61, the nonmagnetic film 62, the second nonmagnetic conductive film 63, the first magnetic layer 161P and the second magnetic layer 162P are thereby flattened. This step is called a second polishing step. Through this second polishing step, remaining portions of the first magnetic layer 161P and the second magnetic layer 162P in the groove 72a become the first layer 161 and the second layer 162, respectively. The second polishing step is stopped when the nonmagnetic conductive film 61 is exposed. It is thereby possible to control the thickness of the pole layer 16 made up of the first layer 161 and the second layer 162 with accuracy.

The following steps are the same as those of the first embodiment. FIG. 40A and FIG. 40B illustrate the state in which the shield layer 20 is completed. The magnetic head of the sixth embodiment has a configuration similar to that of the first embodiment except the portions formed through the steps illustrated in FIG. 36A to FIG. 39A and FIG. 36B to FIG. 39B.

According to the sixth embodiment, the pole layer 16 is disposed in the groove 72a of the pole-layer-encasing layer 72 made of a nonmagnetic conductive material, with the first nonmagnetic conductive film 61, the nonmagnetic film 62 and the second nonmagnetic conductive film 63 provided between the encasing layer 72 and the pole layer 16.

In the sixth embodiment, the second nonmagnetic conductive film 63 or the first layer 161 of the pole layer 16 may be omitted. If the nonmagnetic conductive film 63 is omitted, the first magnetic layer 161P serves as an electrode for forming the second magnetic layer 162P by plating. If the first layer 161 is omitted, a magnetic layer to be the pole layer 16 is formed by plating, for example, on the nonmagnetic conductive film 63.

The remainder of the operation and effects of the sixth embodiment are similar to those of the third embodiment.

Seventh Embodiment

A magnetic head and a method of manufacturing the same of a seventh embodiment of the invention will now be described. Reference is now made to FIG. 41A to FIG. 45A and FIG. 41B to FIG. 45B to describe the method of manufacturing the magnetic head of the seventh embodiment. FIG. 41A to FIG. 45A are cross sections of layered structures obtained through the manufacturing process of the magnetic head, the cross sections being orthogonal to the medium facing surface and the substrate. FIG. 41B to FIG. 45B are cross sections of portions of the layered structures near the medium facing surface that are parallel to the medium facing surface. The coil 9 and the insulating layers 10 and 11 and portions closer to the substrate 1 than the coil 9 and the insulating layers 10 and 11 are omitted in FIG. 41A to FIG. 45A and FIG. 41B to FIG. 45B.

The method of manufacturing the magnetic head of the seventh embodiment includes the steps up to the step of forming the groove 72a of the pole-layer-encasing layer 72 that are the same as those of the fourth embodiment.

FIG. 41A and FIG. 41B illustrate the following step. In the step, first, the first magnetic layer 161P is formed in the groove 72a of the pole-layer-encasing layer 72 and on the top surface of the encasing layer 72. The thickness, the material and the forming method of the first magnetic layer 161P are the same as those of the first embodiment. In the seventh embodiment, however, a portion of the groove 72a corresponding to the track width defining portion 16A of the pole layer 16 is almost completely filled with the first magnetic layer 161P.

Next, as shown in FIG. 42A and FIG. 42B, the second magnetic layer 162P is formed on the first magnetic layer 161P. The thickness, the material and the forming method of the second magnetic layer 162P are the same as those of the first embodiment. In the seventh embodiment, however, the second magnetic layer 162P is patterned to have a specific geometry so as to serve as a mask for patterning the pole-layer-encasing layer 72 later, as in the fourth embodiment. The second magnetic layer 162P has a plane geometry that is slightly greater than that of the pole layer 16, for example.

FIG. 43A and FIG. 43B illustrate the following step. In the step, first, the first magnetic layer 161P and the pole-layer-encasing layer 72 are selectively etched by reactive ion etching or ion beam etching, for example, using the second magnetic layer 162P as a mask. Next, the insulating layer 73 made of alumina, for example, and having a thickness of 0.5 to 0.8 µm, for example, is formed on the entire top surface of the layered structure.

Next, as shown in FIG. 44A and FIG. 44B, the insulating layer 73, the second magnetic layer 162P and the first magnetic layer 161P are polished by CMP, for example, so that the pole-layer-encasing layer 72 is exposed, and the top surfaces of the first magnetic layer 161P, the second magnetic layer 162P and the insulating layer 73 are thereby flattened. As a result, portions of the first magnetic layer 161P and the second magnetic layer 162P that are disposed on the top surface of the pole-layer-encasing layer 72 are removed, and the remaining portions of the first magnetic layer 161P and the second magnetic layer 162P in the groove 72a become the first layer 161 and the second layer 162, respectively. The above-mentioned polishing is stopped when the encasing layer 72 is exposed. It is thereby possible to control the thickness of the pole layer 16 made up of the first layer 161 and the second layer 162 with accuracy.

The following steps are the same as those of the first embodiment. FIG. 45A and FIG. 45B illustrate the state in which the shield layer 20 is completed. FIG. 46 is a top view of the pole-layer-encasing layer 72 and the pole layer 16. The magnetic head of the seventh embodiment has a configuration similar to that of the first embodiment except the portions formed through the steps illustrated in FIG. 41A to FIG. 44A and FIG. 41B to FIG. 44B.

According to the seventh embodiment, the pole layer 16 is disposed in the groove 72a of the pole-layer-encasing layer 72 made of a nonmagnetic conductive material. In the embodiment, when the second magnetic layer 162P is formed by plating, the encasing layer 72 and the first magnetic layer 161P function as electrodes for plating. Therefore, it is possible to feed a sufficient current to the encasing layer 72 and the first magnetic layer 161P as the electrodes even if the first magnetic layer 161P is thin. It is thereby possible to form the uniform second magnetic layer 162P in the groove 72a. As a result, according to the embodiment, it is possible to form the uniform pole layer 16 with accuracy even if the groove 72a has a small width.

In the seventh embodiment, the magnetic layers 161P and 162P to be the pole layer 16 are formed in the groove 72a of the pole-layer-encasing layer 72 and on the top surface of the encasing layer 72. Furthermore, the magnetic layers 161P and 162P are polished until the encasing layer 72 is exposed, so that the magnetic layers 161P and 162P become the pole layer 16. The polishing of the magnetic layers 161P and 162P is stopped when the encasing layer 72 is exposed. Therefore, the encasing layer 72 functions as a layer for determining the level at which polishing of the magnetic layers 161P and 162P is stopped. According to the embodiment, it is possible to control the thickness of the pole layer 16 with accuracy.

In the seventh embodiment, the first layer 161 of the pole layer 16 may be omitted. In this case, a magnetic layer to be the pole layer 16 is formed by plating, using the pole-layer-encasing layer 72 as an electrode for plating, for example.

The remainder of the operation and effects of the seventh embodiment are similar to those of the first embodiment except the operation and effects based on the nonmagnetic conductive film 13 of the first embodiment.

Eighth Embodiment

A magnetic head and a method of manufacturing the same of an eighth embodiment of the invention will now be described. FIG. 47A and FIG. 47B are cross sections of the main part of the magnetic head of the eighth embodiment. The coil 9 and the insulating layers 10 and 11 and portions closer to the substrate 1 than the coil 9 and the insulating layers 10 and 11 are omitted in FIG. 47A and FIG. 47B.

The magnetic head of the eighth embodiment comprises an insulating layer 81, a yoke layer 82, an insulating layer 83, a pole-layer-encasing layer 84 and an insulating layer 85 in place of the insulating layer 71, the pole-layer-encasing layer 72 and the insulating layer 73 of the fourth embodiment.

The insulating layer 81 is disposed on the flattened top surfaces of the coil 9 and the insulating layers 10 and 11 of FIG. 2. The insulating layer 81 is made of alumina, for example. The yoke layer 82 is disposed on the insulating layer 81. An end of the yoke layer 82 located on a side of the medium facing surface 30 is disposed at a distance from the medium facing surface 30. The yoke layer 82 is made of a magnetic material such as CoNiFe. The insulating layer 83 is disposed around the yoke layer 82. The yoke layer 82 and the insulating layer 83 have flattened top surfaces. The insulating layer 83 is made of alumina, for example.

The pole-layer-encasing layer 84 is disposed on the yoke layer 82 and the insulating layer 83. The encasing layer 84 is made of a nonmagnetic conductive material. The specific material of the encasing layer 84 is the same as that of the encasing layer 72 of the fourth embodiment.

The encasing layer 84 has a groove 84a in which the pole layer 16 is placed. The groove 84a penetrates the encasing layer 84. The pole layer 16 is placed in the groove 84a, and the bottom surface of the pole layer 16 is in contact with the top surface of the yoke layer 82. The yoke layer 82 together with the pole layer 16 forms a magnetic path through which a magnetic flux corresponding to the magnetic field generated by the coil 22 passes. The insulating layer 85 is disposed around the encasing layer 84. The pole layer 16, the encasing layer 84 and the insulating layer 85 have flattened top surfaces.

The remainder of configuration of the magnetic head of the eighth embodiment is the same as that of the first embodiment.

The method of manufacturing the magnetic head of the eighth embodiment includes the steps up to the step of flattening the top surfaces of the coil 9 and the insulating layers 10 and 11 that are the same as those of the first embodiment. In the following step of the eighth embodiment, the insulating layer 81 is formed on the flattened top surfaces of the coil 9 and the insulating layers 10 and 11. Next, the yoke layer 82 is formed by plating, for example, on the insulating layer 81. Next, the insulating layer 83 is formed on the entire top surface of the layered structure. The insulating layer 83 is then polished by CMP, for example, so that the yoke layer 82 is exposed, and the top surfaces of the yoke layer 82 and the insulating layer 83 are thereby flattened. Next, the pole-layer-encasing layer 84 is formed on the yoke layer 82 and the insulating layer 83. Next, the groove 84a is formed in the pole-layer-encasing layer 84. A method of forming the groove 84a is the same as the method of forming the groove 12a of the first embodiment.

Next, a magnetic layer to be the pole layer 16 is formed by plating, for example, in the groove 84a of the pole-layer-encasing layer 84 and on the top surface of the encasing layer 84. When the magnetic layer is formed by plating, an electrode film for plating is formed in advance in the groove 84a and on the top surface of the encasing layer 84. The magnetic layer is patterned to have a specific shape so as to serve as a mask for patterning the encasing layer 84 later. Next, the encasing layer 84 is selectively etched by reactive ion etching or ion beam etching, for example, using the magnetic layer as a mask. Next, the insulating layer 85 made of alumina, for example, and having a thickness of 0.5 to 0.8 μm, for example, is formed on the entire top surface of the layered structure.

Next, the insulating layer 85 and the magnetic layer are polished by CMP, for example, so that the pole-layer-encasing layer 84 is exposed, and the top surfaces of the magnetic layer and the insulating layer 85 are thereby flattened. As a result, a portion of the magnetic layer disposed on the top surface of the pole-layer-encasing layer 84 is removed, and the remaining portion of the magnetic layer in the groove 84a becomes the pole layer 16.

The above-mentioned polishing is stopped when the encasing layer 84 is exposed. It is thereby possible to control the thickness of the pole layer 16 with accuracy.

The following steps are the same as those of the first embodiment. FIG. 47A and FIG. 47B illustrate the state in which the shield layer 20 is completed.

According to the eighth embodiment, the pole layer 16 is disposed in the groove 84a of the pole-layer-encasing layer 84 made of a nonmagnetic conductive material. In the embodiment, when the magnetic layer to be the pole layer 16 is formed by plating, the yoke layer 82 and the encasing layer 84 function as electrodes for plating. Therefore, it is possible to feed a sufficient current to the yoke layer 82 and the encasing layer 84 as the electrodes even if the groove 84a has a small width. It is thereby possible to form the uniform magnetic layer in the groove 84a. As a result, according to the embodiment, it is possible to form the uniform pole layer 16 with accuracy even if the groove 84a has a small width.

According to the eighth embodiment, the magnetic layer to be the pole layer 16 is formed in the groove 84a of the pole-layer-encasing layer 84 and on the top surface of the encasing layer 84. Furthermore, the magnetic layer is polished until the encasing layer 84 is exposed, so that the magnetic layer becomes the pole layer 16. The polishing of the magnetic layer is stopped when the encasing layer 84 is exposed. Therefore, the encasing layer 84 functions as a layer for determining the level at which polishing of the magnetic layer is stopped. According to the embodiment, it is possible to control the thickness of the pole layer 16 with accuracy.

In the eighth embodiment, the pole layer 16 may be made up of the first layer 161 and the second layer 162 as in the first to seventh embodiments.

The remainder of the operation and effects of the eighth embodiment are similar to those of the first embodiment except the operation and effects based on the nonmagnetic conductive film 13 of the first embodiment.

Ninth Embodiment

A magnetic head and a method of manufacturing the same of a ninth embodiment of the invention will now be described. Reference is now made to FIG. 48A to FIG. 61A and FIG. 48B to FIG. 51B to describe the method of manufacturing the magnetic head of the ninth embodiment. FIG. 48A to FIG. 51A are cross sections of layered structures obtained through the manufacturing process of the magnetic head, the cross sections being orthogonal to the medium facing surface and the substrate. FIG. 48B to FIG. 51B are cross sections of portions of the layered structures near the medium facing surface that are parallel to the medium facing surface. The coil 9 and the insulating layers 10 and 11 and portions closer to the substrate 1 than the coil 9 and the insulating layers 10 and 11 are omitted in FIG. 48A to FIG. 51A and FIG. 48B to FIG. 51B.

The method of manufacturing the magnetic head of the ninth embodiment includes the steps up to the step of forming the groove 72a of the pole-layer-encasing layer 72 that are the same as those of the fourth embodiment.

Figures 48A, 48B:
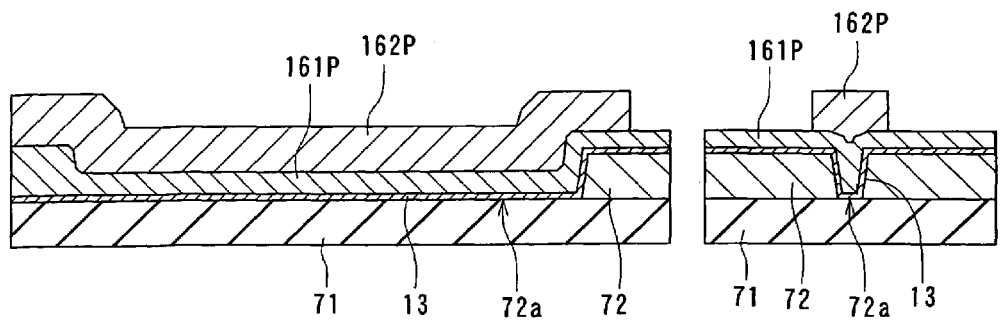
FIG. 48A and FIG. 48B are views for illustrating a step of a method of manufacturing a magnetic head of a ninth embodiment of the invention.

FIG. 48A and FIG. 48B illustrate the following step. In the step, first, the nonmagnetic conductive film 13 is formed in the groove 72a of the pole-layer-encasing layer 72 and on the top surface of the encasing layer 72. Although the groove 72a penetrates the encasing layer 72 in FIG. 48A and FIG. 48B, it is possible that the groove 72a does not penetrate the encasing layer 72. The thickness, the material and the forming method of the nonmagnetic conductive film 13 are the same as those of the first embodiment. Next, the first magnetic layer 161P and the second magnetic layer 162P are formed one by one on the nonmagnetic conductive film 13 in a manner the same as that of the first embodiment. In the ninth embodiment, however, a portion of the groove 72a corresponding to the track width defining portion 16A of the pole layer 16 is almost completely filled with the first magnetic layer 161P. Furthermore, the second magnetic layer 162P is patterned to have a specific geometry so as to serve as a mask for patterning the pole-layer-encasing layer 72 later. The second magnetic layer 162P has a plane geometry that is slightly greater than that of the pole layer 16, for example.

Figures 49A, 49B:
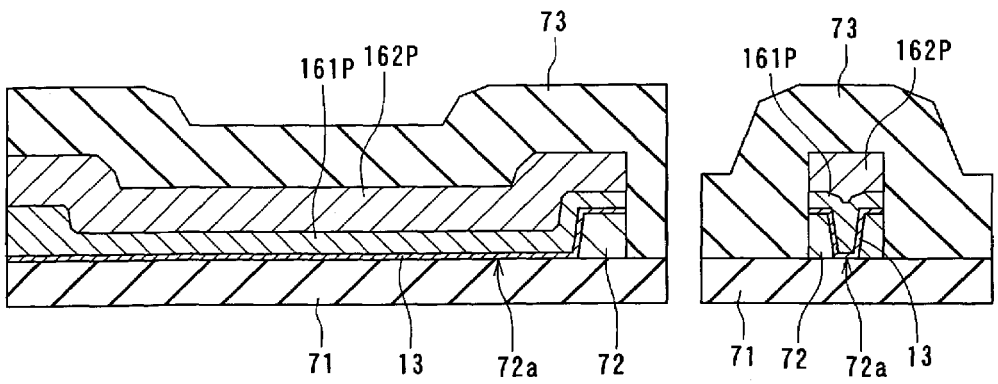
FIG. 49A and FIG. 49B are views for illustrating a step that follows the step shown in FIG. 48A and FIG. 48B.

FIG. 49A and FIG. 49B illustrate the following step. In the step, first, the first magnetic layer 161P, the nonmagnetic conductive film 13 and the pole-layer-encasing layer 72 are selectively etched by reactive ion etching or ion beam etching, for example, using the second magnetic layer 162P as a mask. Next, the insulating layer 73 made of alumina, for example, and having a thickness of 0.5 to 0.8 µm, for example, is formed on the entire top surface of the layered structure.

Next, as shown in FIG. 50A and FIG. 50B, the insulating layer 73, the second magnetic layer 162P and the first magnetic layer 161P are polished by CMP, for example, so that the nonmagnetic conductive film 13 is exposed, and the top surfaces of the nonmagnetic conductive film 13, the first magnetic layer 161P, the second magnetic layer 162P and the insulating layer 73 are thereby flattened. As a result, portions of the first magnetic layer 161P and the second magnetic layer 162P that are disposed on the top surface of the pole-layer-encasing layer 72 are removed, and the remaining portions of the first magnetic layer 161P and the second magnetic layer 162P in the groove 72a become the first layer 161 and the second layer 162, respectively. The above-mentioned polishing is stopped when the nonmagnetic conductive film 13 is exposed. It is thereby possible to control the thickness of the pole layer 16 made up of the first layer 161 and the second layer 162 with accuracy.

The following steps are the same as those of the first embodiment. FIG. 51A and FIG. 51B illustrate the state in which the shield layer 20 is completed. The magnetic head of the ninth embodiment has a configuration similar to that of the first embodiment except the portions formed through the steps illustrated in FIG. 48A to FIG. 50A and FIG. 48B to FIG. 50B.

According to the ninth embodiment, the pole layer 16 is disposed in the groove 72a of the pole-layer-encasing layer 72 made of a nonmagnetic conductive material, with the nonmagnetic conductive film 13 provided between the encasing layer 72 and the pole layer 16. In the ninth embodiment, when the second magnetic layer 162P is formed by plating, the encasing layer 72, the nonmagnetic conductive film 13 and the first magnetic layer 161P function as electrodes for plating. Therefore, it is possible to feed a sufficient current to the encasing layer 72, the nonmagnetic conductive film 13 and the first magnetic layer 161P as the electrodes even if the first magnetic layer 161P is thin. It is thereby possible to form the uniform second magnetic layer 162P in the groove 72a. As a result, according to the embodiment, it is possible to form the uniform pole layer 16 with accuracy even if the groove 72a has a small width.

In the ninth embodiment, the first layer 161 of the pole layer 16 may be omitted. In this case, a magnetic layer to be the pole layer 16 is formed by plating, for example, on the nonmagnetic conductive film 13.

The remainder of the operation and effects of the ninth embodiment are similar to those of the first embodiment.

The present invention is not limited to the foregoing embodiments but may be practiced in still other ways. For example, the yoke layer 82 of the eighth embodiment may be provided in any other embodiment.

In the foregoing embodiments, the magnetic head is disclosed, having such a configuration that the read head is formed on the base body and the write head is stacked on the read head. Alternatively, the read head may be stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:
   a medium facing surface that faces toward a recording medium;
   a coil for generating a magnetic field corresponding to data to be written on the recording medium;
   a pole layer having an end located in the medium facing surface, allowing a magnetic flux corresponding to the field generated by the coil to pass therethrough, and generating a write magnetic field for writing the data on the recording medium through the use of a perpendicular magnetic recording system; and
   a substrate on which the pole layer and the coil are stacked, wherein:
   the end of the pole layer located in the medium facing surface has: a first side close to the substrate; a second side located opposite to the first side; a third side connecting an end of the first side to an end of the second side; and a fourth side connecting the other end of the first side to the other end of the second side;
   the second side defines a track width; and
   the end of the pole layer has a width that decreases as a distance from the first side decreases, the magnetic head further comprising:
   a pole-layer-encasing layer made of a nonmagnetic material and having a groove in which the pole layer is placed; and
   a nonmagnetic film made of a nonmagnetic insulating material or a nonmagnetic semiconductor material and disposed in the groove in such a manner as to be sandwiched between the encasing layer and the pole layer,
   wherein the pole layer incorporates: a first layer located at a position in the groove closer to a surface of the groove; and a second layer located at a position in the groove farther from the surface of the groove, wherein the first layer is sandwiched between the surface of the groove and the second layer.

2. A magnetic head for perpendicular magnetic recording comprising:
   a medium facing surface that faces toward a recording medium;
   a coil for generating a magnetic field corresponding to data to be written on the recording medium;
   a pole layer having an end located in the medium facing surface, allowing a magnetic flux corresponding to the field generated by the coil to pass therethrough, and generating a write magnetic field for writing the data on the recording medium through the use of a perpendicular magnetic recording system; and
   a substrate on which the pole layer and the coil are stacked, wherein:
   the end of the pole layer located in the medium facing surface has: a first side close to the substrate; a second side located opposite to the first side; a third side connecting an end of the first side to an end of the second side; and a fourth side connecting the other end of the first side to the other end of the second side;
   the second side defines a track width; and the end of the pole layer has a width that decreases as a distance from the first side decreases, the magnetic head further comprising:

a pole-layer-encasing layer made of a nonmagnetic material and having a groove in which the pole layer is placed;

a nonmagnetic film made of a nonmagnetic insulating material or a nonmagnetic semiconductor material and disposed in the groove in such a manner as to be sandwiched between the encasing layer and the pole layer; and a nonmagnetic conductive film disposed in the groove in such a manner as to be sandwiched between the nonmagnetic film and the pole layer.

3. A magnetic head for perpendicular magnetic recording comprising:

a medium facing surface that faces toward a recording medium;

a coil for generating a magnetic field corresponding to data to be written on the recording medium;

a pole layer having an end located in the medium facing surface, allowing a magnetic flux corresponding to the field generated by the coil to pass therethrough, and generating a write magnetic field for writing the data on the recording medium through the use of a perpendicular magnetic recording system; and a substrate on which the pole layer and the coil are stacked, wherein:

the end of the pole layer located in the medium facing surface has: a first side close to the substrate; a second side located opposite to the first side; a third side connecting an end of the first side to an end of the second side; and a fourth side connecting the other end of the first side to the other end of the second side;

the second side defines a track width; and the end of the pole layer has a width that decreases as a distance from the first side decreases, the magnetic head further comprising:

a pole-layer-encasing layer made of a nonmagnetic insulating material and having a groove in which the pole layer is placed; and a nonmagnetic conductive film disposed in the groove in such a manner as to be sandwiched between the encasing layer and the pole layer, wherein the pole layer incorporates: a first layer located at a position in the groove closer to a surface of the groove; and a second layer located at a position in the groove farther from the surface of the groove, wherein the first layer is sandwiched between the surface of the groove and the second layer.

* * * * *